(12) United States Patent
Crean et al.

(10) Patent No.: US 8,392,224 B2
(45) Date of Patent: *Mar. 5, 2013

(54) TRAVEL INFORMATION FARE HISTORY GRAPH

(75) Inventors: Hugh Crean, Seattle, WA (US); Jay Bartot, Seattle, WA (US); Michael Fridgen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1255 days.

This patent is subject to a terminal disclaimer.

(21) Appl. No.: 11/675,617

(22) Filed: Feb. 15, 2007

(65) Prior Publication Data
US 2007/0198309 A1 Aug. 23, 2007

Related U.S. Application Data

(60) Provisional application No. 60/774,958, filed on Feb. 17, 2006, provisional application No. 60/803,343, filed on May 26, 2006, provisional application No. 60/809,538, filed on May 30, 2006.

(51) Int. Cl.
*G06Q 10/00* (2012.01)
*G06F 17/00* (2006.01)
*G06G 7/00* (2006.01)
(52) U.S. Cl. .......................................... 705/5; 705/400
(58) Field of Classification Search .................. None
See application file for complete search history.

(56) References Cited

U.S. PATENT DOCUMENTS

| | | | |
|---|---|---|---|
| 4,837,744 A | 6/1989 | Marquot et al. | |
| 4,922,439 A | 5/1990 | Greenblatt | |
| 5,021,693 A | 6/1991 | Shima et al. | |
| 5,237,499 A | 8/1993 | Garback | |
| 5,255,184 A | 10/1993 | Hornick | |
| 5,270,921 A | 12/1993 | Hornick | |
| 5,289,401 A | 2/1994 | Shima | |
| 5,704,017 A | 12/1997 | Heckerman | |
| 5,732,398 A | 3/1998 | Tagawa | |
| 5,794,207 A | 8/1998 | Walker et al. | |
| 5,797,127 A | 8/1998 | Walker et al. | |
| 5,832,452 A | 11/1998 | Schneider et al. | |

(Continued)

FOREIGN PATENT DOCUMENTS

EP 1148433 A1 10/2001
JP 2131012 A2 5/1990

(Continued)

OTHER PUBLICATIONS

Credeur, Mary J, Worldspan bringing 'transparency' to airline ticket prices, Atlanta Business Chronicle, Feb. 14, 2003.*

(Continued)

*Primary Examiner* — George Chen
(74) *Attorney, Agent, or Firm* — Perkins Coie LLP

(57) ABSTRACT

A method and system for presenting travel information in a way that facilitates identifying travel plans that satisfy objectives is provided. A travel information system collects travel information for the travel items on various observation dates including the current date and presents the travel information to a user in a way that facilitates travel planning and travel shopping. The travel information system stores the travel information in an observation store. To provide travel information that satisfies a search criterion, the travel information system retrieves the travel information that satisfies the search criterion either from flight information of the observation store or from current flight information provided in real time from a source of travel information. The flight information system provides the travel information in various formats to facilitate travel planning. These formats include a fare history graph, an interval grid, a route map, a future fare graph, and/or a departure date/duration grid.

17 Claims, 18 Drawing Sheets

U.S. PATENT DOCUMENTS

| | | | |
|---|---|---|---|
| 5,864,818 | A | 1/1999 | Feldman |
| 5,875,126 | A | 2/1999 | Minch et al. |
| 5,897,620 | A | 4/1999 | Walker et al. |
| 5,918,209 | A | 6/1999 | Campbell |
| 5,933,039 | A | 8/1999 | Hui et al. |
| 6,041,308 | A | 3/2000 | Walker et al. |
| 6,076,070 | A | 6/2000 | Stack |
| 6,085,164 | A | 7/2000 | Smith et al. |
| 6,085,169 | A | 7/2000 | Walker et al. |
| 6,092,017 | A | 7/2000 | Ishida et al. |
| 6,108,639 | A | 8/2000 | Walker et al. |
| 6,112,185 | A | 8/2000 | Walker et al. |
| 6,134,534 | A | 10/2000 | Walker |
| 6,167,383 | A | 12/2000 | Henson |
| 6,240,396 | B1 | 5/2001 | Walker et al. |
| 6,263,323 | B1 | 7/2001 | Baggett |
| 6,275,808 | B1 | 8/2001 | DeMarcken |
| 6,295,521 | B1 | 9/2001 | DeMarcken |
| 6,307,572 | B1 | 10/2001 | DeMarcken |
| 6,332,129 | B1 | 12/2001 | Walker et al. |
| 6,345,090 | B1 | 2/2002 | Walker et al. |
| 6,356,878 | B1 | 3/2002 | Walker et al. |
| 6,377,932 | B1 | 4/2002 | Demarcken |
| 6,381,578 | B1 | 4/2002 | Demarcken |
| 6,418,413 | B2 | 7/2002 | DeMarcken et al. |
| 6,418,415 | B1 | 7/2002 | Walker et al. |
| 6,442,526 | B1 | 8/2002 | Vance et al. |
| 6,484,153 | B1 | 11/2002 | Walker et al. |
| 6,510,418 | B1 | 1/2003 | Case et al. |
| 6,553,346 | B1 | 4/2003 | Walker et al. |
| 6,567,824 | B2 | 5/2003 | Fox |
| 6,609,098 | B1 | 8/2003 | Demarcken |
| 6,658,422 | B1 | 12/2003 | Levanoni |
| 6,974,079 | B1 | 12/2005 | Strothmann et al. |
| 6,990,457 | B1 | 1/2006 | Litman et al. |
| 7,010,494 | B2 | 3/2006 | Etzioni et al. |
| 7,076,451 | B1 | 7/2006 | Coupland et al. |
| 7,136,821 | B1 | 11/2006 | Kohavi et al. |
| 7,181,410 | B1 | 2/2007 | Jones et al. |
| 7,209,895 | B2 | 4/2007 | Kundtz et al. |
| 7,263,496 | B1 | 8/2007 | Weigelt et al. |
| 7,263,664 | B1 | 8/2007 | Daughtrey |
| 7,313,539 | B1 | 12/2007 | Pappas et al. |
| 7,394,900 | B1 | 7/2008 | Gerber et al. |
| 7,693,750 | B2 | 4/2010 | Christensen |
| 7,797,187 | B2 | 9/2010 | Crean et al. |
| 7,974,863 | B2 | 7/2011 | Etzioni et al. |
| 8,200,514 | B1 | 6/2012 | Crean et al. |
| 8,200,549 | B1 | 6/2012 | Crean et al. |
| 2001/0039519 | A1 | 11/2001 | Richards |
| 2002/0002548 | A1 | 1/2002 | Roundtree |
| 2002/0007331 | A1 | 1/2002 | Lo et al. |
| 2002/0032666 | A1 | 3/2002 | Kawamura |
| 2002/0082877 | A1 | 6/2002 | Schiff et al. |
| 2002/0099636 | A1 | 7/2002 | Narumo |
| 2002/0111935 | A1 | 8/2002 | Jones et al. |
| 2002/0116348 | A1 | 8/2002 | Phillips et al. |
| 2002/0120492 | A1 | 8/2002 | Phillips et al. |
| 2002/0152101 | A1 | 10/2002 | Lawson et al. |
| 2002/0152111 | A1 | 10/2002 | Cox et al. |
| 2002/0156659 | A1 | 10/2002 | Walker et al. |
| 2002/0156661 | A1 | 10/2002 | Jones et al. |
| 2002/0161689 | A1 | 10/2002 | Segal |
| 2002/0169760 | A1 | 11/2002 | Cheung et al. |
| 2002/0178069 | A1 | 11/2002 | Walker et al. |
| 2002/0184059 | A1 | 12/2002 | Offutt et al. |
| 2003/0004760 | A1 | 1/2003 | Schiff et al. |
| 2003/0023500 | A1 | 1/2003 | Boies et al. |
| 2003/0033164 | A1 | 2/2003 | Faltings et al. |
| 2003/0036928 | A1 | 2/2003 | Kenigsberg et al. |
| 2003/0040946 | A1 | 2/2003 | Sprenger et al. |
| 2003/0055779 | A1 | 3/2003 | Wolf |
| 2003/0061179 | A1 | 3/2003 | Reece |
| 2003/0061211 | A1 | 3/2003 | Shultz et al. |
| 2003/0069747 | A1 | 4/2003 | Strothmann et al. |
| 2003/0125994 | A1 | 7/2003 | Jaehn et al. |
| 2003/0130899 | A1 | 7/2003 | Ferguson et al. |
| 2003/0154142 | A1 | 8/2003 | Ginsburg et al. |
| 2003/0182052 | A1 | 9/2003 | DeLorme et al. |
| 2003/0187705 | A1 | 10/2003 | Schiff et al. |
| 2003/0187771 | A1 | 10/2003 | Bulan |
| 2003/0187772 | A1 | 10/2003 | Papka |
| 2003/0225608 | A1 | 12/2003 | Wu et al. |
| 2003/0229552 | A1 | 12/2003 | Lebaric et al. |
| 2004/0054634 | A1 | 3/2004 | Tak |
| 2004/0078252 | A1* | 4/2004 | Daughtrey et al. ............... 705/5 |
| 2004/0098287 | A1 | 5/2004 | Young et al. |
| 2004/0249683 | A1 | 12/2004 | Demarcken et al. |
| 2005/0004819 | A1* | 1/2005 | Etzioni et al. ..................... 705/5 |
| 2005/0033616 | A1 | 2/2005 | Vavul et al. |
| 2005/0043974 | A1 | 2/2005 | Vassilev et al. |
| 2005/0044001 | A1 | 2/2005 | Narayanaswami |
| 2005/0086087 | A1 | 4/2005 | Razza et al. |
| 2005/0090911 | A1 | 4/2005 | Ingargiola et al. |
| 2005/0091146 | A1 | 4/2005 | Levinson |
| 2005/0108069 | A1 | 5/2005 | Shiran et al. |
| 2005/0154620 | A1 | 7/2005 | Hentschel et al. |
| 2005/0177402 | A1 | 8/2005 | Walker et al. |
| 2005/0197893 | A1 | 9/2005 | Landau et al. |
| 2005/0216301 | A1 | 9/2005 | Brown |
| 2005/0273373 | A1 | 12/2005 | Walker et al. |
| 2005/0283389 | A1 | 12/2005 | Widjaja et al. |
| 2006/0064333 | A1 | 3/2006 | Razza et al. |
| 2006/0106655 | A1 | 5/2006 | Lettovsky et al. |
| 2006/0116901 | A1 | 6/2006 | Ookubo et al. |
| 2006/0129463 | A1 | 6/2006 | Zicherman |
| 2006/0143159 | A1 | 6/2006 | Chowdhury et al. |
| 2006/0161480 | A1 | 7/2006 | Christensen |
| 2006/0173753 | A1 | 8/2006 | Padmanabhan et al. |
| 2006/0206395 | A1 | 9/2006 | Vallabh |
| 2006/0235768 | A1* | 10/2006 | Tatum et al. .................... 705/28 |
| 2006/0247954 | A1 | 11/2006 | Hunt |
| 2007/0021991 | A1 | 1/2007 | Etzioni et al. |
| 2007/0038553 | A1 | 2/2007 | Miller et al. |
| 2007/0061174 | A1 | 3/2007 | Phillips |
| 2007/0073562 | A1 | 3/2007 | Brice et al. |
| 2007/0112635 | A1 | 5/2007 | Loncaric |
| 2007/0226084 | A1 | 9/2007 | Cowles |
| 2008/0046298 | A1 | 2/2008 | Ben-Yehuda et al. |
| 2008/0091726 | A1 | 4/2008 | Koretz et al. |
| 2008/0103842 | A1 | 5/2008 | Johnson |
| 2008/0114622 | A1 | 5/2008 | Crean et al. |
| 2008/0208663 | A1 | 8/2008 | Walker et al. |
| 2008/0228658 | A1 | 9/2008 | Crean et al. |
| 2009/0030746 | A1 | 1/2009 | Etzioni et al. |
| 2009/0063167 | A1 | 3/2009 | Bartot et al. |
| 2010/0250291 | A1 | 9/2010 | Walker et al. |
| 2011/0046989 | A1 | 2/2011 | Crean et al. |
| 2011/0131109 | A1 | 6/2011 | Pappas et al. |
| 2011/0251917 | A1 | 10/2011 | Etzioni et al. |

FOREIGN PATENT DOCUMENTS

| | | |
|---|---|---|
| JP | 5335656 A2 | 12/1993 |
| JP | 2000076335 A | 3/2000 |
| JP | 2002024550 A | 1/2002 |
| JP | 2002092249 A2 | 3/2002 |
| JP | 2002259779 A2 | 9/2002 |
| JP | 2002358472 A2 | 12/2002 |
| JP | 2003006293 A | 1/2003 |
| JP | 2005275487 A | 10/2005 |
| WO | WO-0057331 A2 | 9/2000 |
| WO | WO-03/052550 A2 | 6/2003 |
| WO | WO-03081385 A | 10/2003 |
| WO | WO-03081385 A2 | 10/2003 |
| WO | WO-2007143577 A2 | 12/2007 |

OTHER PUBLICATIONS

"Worldspan Introduces FareAware, Powerful New Low-Fare Search Solution for the Online Travel Market", PRNewswire, Feb. 17, 2003, http://www.thefreelibrary.com/_/print/PrintArticle.aspx?id=97719443, retrieved Nov. 9, 2012.*

Rivalwatch.com, 1999-2003, [accessed May 23, 2005], 15 pages.

Davis, Stan et al., "BLUR—the speed of change in the connected economy," Sep./Oct. 2000, British Journal of Administrative Management, n22, pp. 20, 3 pages.

Chmielewski, Dawn C., "San Francisco-Based Firm Develops Technology for Interactive TV," Apr. 19, 2001, KRTBN Knight-Ridder Tribune Business News (San Jose Mercury News-California), 2 pages.
Cohen, William W., "Fast Effective Rule Induction," Proceedings of the 12th International Conference on Machine Learning, 1995, 10 pages.
Etzioni, Oren et al., "To Buy or Not to Buy: Mining Airfare Data to Minimize Ticket Purchase Price," Proceedings of the Ninth ACM SIGKDD 2003, Aug. 24-27, 2003, Washington, D.C., 10 pages.
ITA Software, "Corporate Background," [accessed Feb. 9, 2004], 1 page.
Muehlbauer, Jen, "Orbitz Reaches New Heights, Better technology results in a competitive advantage," CMP Media LLC, Apr. 2002, pp. 1-5.
Robinson, Sara, "Computer Scientists Find Unexpected Depths in Airfare Search Problem," Society for Industrial and Applied Mathematics, Jul./Aug. 2002, pp. 1-6.
Sutton, Richard S. et al., "Reinforcement Learning: An Introduction," MIT Press, Cambridge, MA, 1998, http://www-anw.cs.umass.edu/~rich/book/the-book.html, [accessed May 5, 2004], pp. 1-3.
Ting, Kai Ming et al., "Issues in Stacked Generalization," Journal of Artificial Intelligence Resarch 10 (1999), pp. 271-289.
U.S. Appl. No. 12/044,229, filed Mar. 7, 2008, Etzioni et al.
U.S. Appl. No. 12/037,775, filed Feb. 26, 2008, Crean.
U.S. Appl. No. 12/048,154, filed Mar. 13, 2008, Crean et al.
U.S. Appl. No. 11/928,725, filed Oct. 30, 2007, Etzioni et al.
U.S. Appl. No. 11/599,607, filed Nov. 13, 2006, Crean et al.
U.S. Appl. No. 11/675,499, filed Feb. 15, 2007, Crean et al.
U.S. Appl. No. 11/675,585, filed Feb. 15, 2007, Fridgen.
U.S. Appl. No. 11/675,589, filed Feb. 15, 2007, Fridgen.
U.S. Appl. No. 11/675,594, filed Feb. 15, 2007, Crean et al.
U.S. Appl. No. 11/675,619, filed Feb. 15, 2007, Crean et al.
U.S. Appl. No. 11/772,523, filed Jul. 2, 2007, Etzioni et al.
U.S. Appl. No. 11/846,507, filed Aug. 28, 2007, Bartot.
Belobaba, Peter P., "Application of a Probabilistic Decision Model to Airline Seat Inventory Control," Mar.-Apr. 1989; Operations Research, pp. 183-197.
Harrill, Rob, "Airline analyzer could save big bucks by advising when to buy tickets," Apr. 1, 2003, University of Washington; http://www.washington.edu/newsroom/news/2003archive/04-03archive/k040103.html.
U.S. Appl. No. 12/253,195, filed Oct. 16, 2008, Crean et al.
Bly, L., "Comparison-Shopping Tools Lure Travelers," USA Today, Oct. 17, 2003 (3 pages).
"NexTag Launches ServicesShopping (SM) With Comparison Shopping for Mortgages, Travel Cars, Real Estate and Education," PR Newswire. Oct. 25, 2004 (2 pages).
TravelCLICK, Hotelligence Report, http://web.archive.org/web/20040202113915/http://www.travelclick.net/Tours/HOTELLIGENCE/HotelligenceSa_SPDFVERSION.pdf, Feb. 2, 2004 (14 pages).
Tedeschi, B., "Orbitz Offers Options for Flexible Travelers," http://proquest.umi.com/pqdweb?did=334784901&sid=1&Fmt=3&clientId=19649&RQT=309&Vnames=PQD, May 11, 2003 (2 pages).
PCT International Search Report, US06/02136, Applicant: Search Party, Inc., Mailing Date: Aug. 17, 2007, (2 pages).
PCT International Search Report, US2008/074680, Applicant: Farecast, Inc., Mailing Date: Mar. 19, 2009, (3 pages).
PCT International Search Report, US08/56901, Applicant: Farecast, Inc., Mailing Date: Jun. 25, 2008, (3 pages).
PCT International Search Report, US07/62332, Applicant: Farecast Inc., Mailing Date: Sep. 25, 2007, (2 pages).
PCT International Search Report, US04/09498, Applicant: University of Washington, Mailing Date: Aug. 2, 2005, (2 pages).
PCT International Search Report, US07/83882, Applicant: Farecast, Inc., Mailing Date: May 7, 2008, (2 pages).
Castleworks, Inc.. "Daily Schedule," http://web.archive.org/web/20040205032101/http://pbskids.org/itsmylife/school/time/print_pied_daily_schedule.html, Feb. 5, 2004 (2 pages).
Anon., "Women Outpace Men in Cell Phone Ownership, but Men Are More Fanatic About PDAs," Business Wire, Mar. 1, 2001, 2 pages.
Richtel, M., "Man Emerges, Still Breathing, After E-Cave Confinement," New York Times, Final Edition, p. 33, col. 1, Sep. 22, 1999, 5 pages.
SeatGuru, Domestic Economy Comparison Chart, http://web.archive.org/web/20060901161020/www.seatguru.com/charts/domestic_economy.php, Sep. 1, 2006, 8 pages.
Grossman, David, "Getting a good airplane seat," http://www.usatoday.com/travel/columnist/grossman/2006-11-03-grossman_x.htm, Nov. 3, 2006, USATODAY.com, 2 pages.
Ioannidis, Yannis, "The History of Histograms (abridged)," Proceedings of the 29th VLDB Conference, Berlin, Germany, 2003, 12 pages.
Merriam Webster, "criteria," http://www.merriam-webster.com/dictionary/criteria, Sep. 22, 2010, 2 pages.
SeatGuru, Finding Your Aircraft Type, http://web.archive.org/web/20060316200628/http://seatguru.com/articles/aircraft_type.php, Mar. 16, 2006, 5 pages.
"Farecast.com Launches Public Beta; Becomes First to Provide Airfair Predictions," PR Newswire, published Jun. 27, 2006, pp. 2-3 of 3 pgs.
U.S. Appl. No. 13/082,362, filed Apr. 7, 2011, Etzioni et al.

* cited by examiner

All Times (Listed)    Select Times (Grid)                    Learn more about List View

Results for:                                  230                          210
Leave: All Times                                              Fare History
  Seattle, WA (SEA)
  Sun, Feb 11 2007
Return: All Times
  Los Angeles, CA (LAX)
  Sat, Feb 17 2007
Adults: 1    Change Search 🛡 Looking for a Fare Guard?
  Learn how to find one.

Flight listing 220

| Refine Results [Reset] | | Price ▼ | Airline | Airport | Departs | Arrives | Stops |
|---|---|---|---|---|---|---|---|
| Showing 354 of 354 options | 240 | $333<br>orbitz.com | Multiple Carriers<br>flight details | SEA>LAX<br>LAX>SEA | 12:40p<br>7:00p | 5:16p<br>9:41p | 1 \| 4h 36m<br>0 \| 2h 41m |
| ▼ Price Range | | $333<br>orbitz.com | Multiple Carriers<br>flight details | SEA>LAX<br>LAX>SEA | 6:05a<br>7:00p | 12:59p<br>9:41p | 1 \| 4h 54m<br>0 \| 2h 41m |
| $333    $1113    $1113 | 250 | $333<br>orbitz.com | Multiple Carriers<br>flight details | SEA>LAX<br>LAX>SEA | 7:56p<br>7:00p | 1:00a<br>9:41p | 1 \| 5h 4m<br>0 \| 2h 41m |
| ▼ Stops<br>☑ 0    $337<br>☑ 1    $333<br>☐ 2+ | | $337<br>alaskaair.com | Alaska<br>flight details | SEA>LAX<br>LAX>SEA | 9:12p<br>7:00p | 11:44p<br>9:41p | 0 \| 2h 32m<br>0 \| 2h 41m |
|  | 260 | $337<br>alaskaair.com | Alaska<br>flight details | SEA>LAX<br>LAX>SEA | 4:00p<br>7:00p | 6:37p<br>9:41p | 0 \| 2h 37m<br>0 \| 2h 41m |
| ▼ Airlines  Compare<br>☑ Alaska    $337<br>☑ America West    $337<br>☑ American    $471<br>☑ Delta    $479<br>☑ Frontier    $368<br>☑ Northwest    $458<br>☑ Southwest    Info<br>☑ US Airways    $337<br>☑ United    $458<br>☑ Multiple Carriers    $333 | | $337<br>alaskaair.com | Alaska<br>flight details | SEA>LAX<br>LAX>SEA | 6:30a<br>7:00p | 9:10a<br>9:41p | 0 \| 2h 40m<br>0 \| 2h 41m |
|  | | $337<br>alaskaair.com | Alaska<br>flight details | SEA>LAX<br>LAX>SEA | 7:38p<br>7:00p | 10:18p<br>9:41p | 0 \| 2h 40m<br>0 \| 2h 41m |
|  | | $337<br>alaskaair.com | Alaska<br>flight details | SEA>LAX<br>LAX>SEA | 5:39p<br>7:00p | 8:20p<br>9:41p | 0 \| 2h 41m<br>0 \| 2h 41m |
|  | | $337<br>alaskaair.com | Alaska<br>flight details | SEA>LAX<br>LAX>SEA | 8:09a<br>7:00p | 10:47a<br>9:41p | 0 \| 2h 42m<br>0 \| 2h 41m |
| interval 270 | | $337<br>alaskaair.com | Alaska<br>flight details | SEA>LAX<br>LAX>SEA | 9:10a<br>7:00p | 11:52a<br>9:41p | 0 \| 2h 42m<br>0 \| 2h 41m |
| ▼ Leave :  ● Departs ○ Arrives<br>  Pre-dawn: 12a-6a    $337<br>  Early a.m.: 6a-9a    $333 | | | | SEA>LAX | 2:30p | 5:12p | 0 \| 2h 42m |

TRAVEL INFORMATION FARE HISTORY GRAPH

CROSS-REFERENCE TO RELATED APPLICATIONS

The application claims the benefit of U.S. Provisional Patent Application No. 60/774,958, filed Feb. 17, 2006, and entitled "Fare Forecasting System (Website UI)"; U.S. Provisional Patent Application No. 60/803,343, filed May 26, 2006, and entitled "Fare Forecasting System (Website UI2)"; and U.S. Provisional Patent Application No. 60/809,538, filed May 30, 2006, and entitled "Fare Forecasting System (Website U12)," which applications are hereby incorporated by reference in their entirety.

BACKGROUND

Many people spend considerable time planning a trip that meets their objectives for the lowest possible cost. For example, a person may want to travel from Seattle to Boston to visit family. Such a person may have considerable flexibility in both when to leave Seattle and how long to stay in Boston. Such a person may be willing to leave any day within the next 30 days at any time and stay for between three and five days in order to get the lowest fare possible. Another person may be willing to leave any day within the next week but only in the mornings and for a stay of two to six days. Such persons typically would be willing to fly on any airline. It can be, however, very difficult for them to identify the airline flight with the lowest possible fare that satisfies their objectives.

To identify an airline flight with the lowest possible fare that satisfies a person's travel objectives, the person may need to visit the web sites of several different airlines and several different airline aggregators (e.g., Orbitz). Upon visiting a web site, the person would submit a search request with a search criterion that specifies a departure location and date and a return location and date. The search criterion may specify a range of departure dates and return dates rather, than specific dates. The search criterion may also specify a preference for departure time range (e.g., 9 a.m. to 12 p.m.) and return time range. The web site then identifies the airline flights that satisfy the search criterion. If the search criterion is fairly broad, however, then it can be time-consuming to search for all the flights that satisfy the criterion. The web site provides a listing of the identified airline flights to the person that may be ordered based on ticket fare or some other criterion. In addition, the person may perform this searching for various combinations of departure locations and return locations. For example, if the person is willing to travel from Seattle to Orlando, New Orleans, Phoenix, or Los Angeles, the person may need to submit four search requests and manually correlate the results. In addition, since the search results are typically displayed in a list format, it can be difficult for a person to identify a desired flight from a long list.

Such a process is both time-consuming and tedious. Because the process is time-consuming, there is no guarantee that, upon completion of the searching, a desired airline flight will still have the same fares, will even have seats still available, or will even be found.

BRIEF DESCRIPTION OF THE DRAWINGS

FIG. 2 is a diagram that illustrates a display page showing search results when a traditional criterion search is selected in one embodiment.

FIG. 9 is a diagram that illustrates an interval grid in one embodiment.

DETAILED DESCRIPTION

Figure 1:
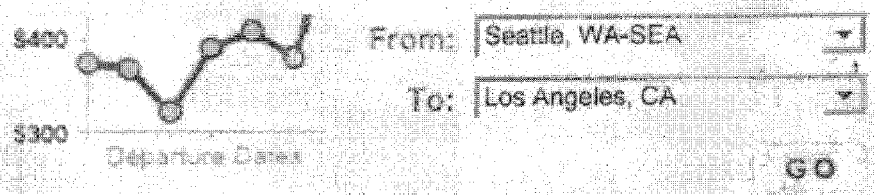
FIG. 1 is a diagram that illustrates a display page for input of the search criterion for viewing flight information in various formats in one embodiment.

A method and system for presenting travel information in a way that facilitates identifying travel plans that satisfy objectives is provided. In one embodiment, a travel information system may collect travel information for the travel items on various observation dates including the current date and present the travel information to a user in a way that facilitates travel planning and travel shopping by providing a person with the ability to quickly locate fares among various travel dates, airlines, and so on. The travel items may be airline trips, hotel rooms, rental cars, ship cruises, travel packages, or other travel-related items. The travel information system may collect the travel information at a specified observation rate (e.g., weekly, once daily, and twice daily) or at a variable observation rate (e.g., weekly during a low demand period and daily during a high demand period). If the travel information is collected more often than daily, then an observation date and time may be associated with each collection of travel information, referred to as an "observation." The travel information system stores the travel information in an observation store. To provide travel information that satisfies a search criterion (e.g., in a user request), the travel information system retrieves the travel information that satisfies the search criterion either from flight information of the observation store or from current flight information provided in real time from a source of travel information (e.g., Sabre, ITA Software, airlines, or hotels). As described below in the context of flight information, a flight information system provides the travel information in various formats to facilitate travel planning. As described below in detail, these formats include a fare history graph, an interval grid, a route map, a future fare graph, and/or a departure date/duration grid.

In one embodiment, a flight information system provides a fare history graph that illustrates the history of fares for airline flights that match a search criterion over various observation dates. For example, a user may submit a search criterion that specifies a departure location and date and a return location and date. The flight information system accesses the observation store to identify the lowest fare that was available on each observation date for flights that satisfy the search criterion. For example, if the current date is January 8 and the user is searching for flights between Seattle and Boston leaving on April 1 and returning on April 5, the observation store may contain flight information for those flights that was collected on January 1 through January 7. Upon identifying the lowest fares on each of the seven observation dates for which information is available, the flight information system generates a graph with the range of lowest fares as one axis and the range of observation dates represented as another axis. The flight information system then adds a line on the graph that plots the lowest fare for each observation date. The flight information system may also retrieve current flight information and add the lowest fare for the current observation date to the graph. The flight information system sends the graph for presentation to a user. The flight information system may also present a listing of current flight information for flights that satisfy the search criterion along with the graph. In this way, a user is presented a graph of the fare history for flights that satisfy the search criterion so that the user can get a sense of how the fare has fluctuated over time.

In one embodiment, the flight information system provides an interval grid that illustrates fares of airline flights that match a search criterion at various combinations of departure intervals of the departure date and return intervals of the return date. Because ticket prices generally vary based on departure and return time of day, the travel information system may divide the travel information into intervals based on time of day. For example, the travel information system may divide each day into six intervals of four hours each. Thus, there are 36 possible combinations of departure and return interval intervals. One skilled in the art will appreciate that the intervals may not be uniform. For example, the first interval may be from midnight to 6 a.m., the second interval may be 6 a.m. to 9 a.m., and so on. The flight information system may retrieve current flight information for flights that satisfy the search criterion (e.g., one submitted by a user). The flight information system generates a grid that contains one axis for departure intervals and another axis for return intervals. The flight information system stores in each cell of the grid an indicator of the lowest fare of flights that satisfy the search criterion and with a departure time during the corresponding departure interval and a return time (i.e., time of departure from the return location) during the corresponding return interval. The flight information system sends that grid for presentation to a user. The flight information system may also present a listing of current flight information for flights that match the search criterion along with the grid. When a user selects a cell of the grid, the flight information system may present a listing of current flight information for only those flights with departure and return times within the corresponding departure interval and return interval. In this way, a user is presented with an interval grid indicating lowest fares for flights that satisfy a search criterion separated out by combinations of departure interval and return interval. One skilled in the art will appreciate that the information of the interval grid can be displayed in formats or graphic representations other than grid formats. For example, the departure intervals can be represented as sections of circle representing 24 hours with the lowest fare for each departure interval indicated within a section of the circle. When a user selects a departure interval, another circle can be displayed showing lowest fares for combinations of the departure interval and all return intervals.

In one embodiment, a flight information system provides a route map that identifies lowest fares for airline flights that satisfy a search criterion with a certain departure location and one or more return locations. For example, a user may want to identify the lowest fares for traveling from Seattle to various destinations or return locations that include Orlando, New Orleans, Phoenix, and Los Angeles. The user may want to plan a trip to the destination with a flight that has the lowest fare. The flight information system may identify the lowest fare for each destination based on the flight information from observations of the observation store or may collect current flight information. The flight information system then the initializes a map of the geographical area encompassing the departure location and the destinations (e.g., a map of the United States). The flight information system then superimposes on the map a route line from the departure location to each of the destinations. For example, the flight information system superimposes a route line (e.g., an arc) from Seattle to Orlando, from Seattle to New Orleans, from Seattle to Phoenix, and from Seattle to Los Angeles. The flight information system then superimposes on the map near each destination an indication of the lowest fare for traveling to that destination. The travel information system then presents the route map to a user. In this way, a user can quickly compare the lowest fares of flights to different destinations based on a graphical representation of the routes from the departure location to the destinations.

In one embodiment, a flight information system provides a future fare graph that plots the lowest fares for traveling from a departure location to one or more destinations on flights that match a search criterion over various departure dates. The flight information system identifies, for each destination, the lowest fare for flights that satisfy the search criterion from the departure location to the destination over a range of departure dates. The travel information system may identify the lowest fares from the flight information of the observation store or may collect current flight information. The travel information system may collect the travel information for departure dates covering a 30-day period. The flight information system then plots a line for each destination that shows the lowest fare over the range of departure dates for flights that satisfy the search criterion. The flight information system may display the lines of the different destinations in different colors to differentiate the fares for the different destinations. One axis of the future fare graph may represent the range of lowest fares, and the other axis of the future fare graph may represent the range of departure dates. The flight information system then sends the future fare graph for presentation to a user. The flight information system may also present a listing of flight information for flights that match the search criterion along with the future fare graph. In this way, a user is presented with a graph of fares for flights over a range of departure dates for multiple destinations.

In one embodiment, the travel information system provides a departure date/duration grid that indicates the lowest fare for various combinations of departure date and duration. The travel information system may identify the lowest fares from the flight information of the observation store or from current flight information. The travel information system identifies the lowest fares for flights that satisfy a search criterion for each departure date and duration combination. The grid contains a cell for each possible combination of departure date and duration. For example, the departure dates may include April 1 through April 30 with durations of three to five days. In such a case, the grid will have 90 (30*3) cells. The travel information system then adds to each cell of the grid an indication of the lowest fare for flights that satisfy the search criterion with the corresponding departure date and duration. For example, the travel information system may fill each cell with a color of varying intensity to indicate the corresponding lowest fare. For example, a low intensity color may indicate a high fare, and a high intensity color may indicate a low fare. The travel information system may also display a legend that maps the color intensities to their corresponding fare level. The travel information system then sends the departure date/duration grid for presentation to a user. The travel information system may also present a listing of the corresponding flight information along with the grid. If a user selects a cell of the grid, then the travel information may present a listing of flight information only for flights with the corresponding departure date and duration. In this way, user is presented with a grid that provides a graphical representation of fare levels for various departure dates and durations. As discussed above with respect to the interval grid, the departure date/duration information can be displayed in formats other than a grid.

FIG. 1-9 are diagrams that illustrate the display of flight information in various formats. FIG. 1 is a diagram that illustrates a display page for input of the search criterion for viewing flight information in various formats in one embodiment. Display page 100 includes a traditional criterion area 110 and a flexible criterion area 120. The traditional criterion area allows a user to input a search criterion for a flight information search that includes departure location, return location, departure date, return date, and number of persons traveling. The flexible criterion area allows users to input a criterion for a flight information search that includes only departure date and return date. When the "Go" button is selected for a criterion area, the flight information system presents search results in various formats.

FIG. 2 is a diagram that illustrates a display page showing search results when a traditional criterion search is selected in one embodiment. Display page 200 includes a fare history graph 210, a flight listing area 220, a results-for area 230, a price range area 240, a stops area 250, an airlines area 260, and an interval area 270. The fare history graph provides a plot of the fare history of the lowest fare for the airline flights that satisfy the search criterion. The vertical axis of the graph indicates the range of lowest fares, and the horizontal axis of the graph indicates the observation dates for which flight information for flights satisfying the search criterion were collected. In this example, the graph provides lowest fare information for 85 observation dates. The flight information system may collect flight information every day and store the flight information in the observation store. Thus, each day is an observation date. In one embodiment, the travel information system may limit the flights for which it retrieves flight information to flights that depart in the next 90 days and that are for durations of 2 to 8 days. One skilled in the art will appreciate that the retrieved flight information can be for any number of departure date and duration length combinations. Thus, for each departure date and return location combination, the travel information system will collect flight information for 630 trips (e.g., 90*7). The 630 possible trips are illustrated in the following table.

| Trip Number | Departure Date | Return Date |
|---|---|---|
| 1 | 1 | 3 |
| 2 | 1 | 4 |
| 3 | 1 | 5 |
| ... | | |
| 7 | 1 | 9 |
| 8 | 2 | 4 |
| 9 | 2 | 5 |
| ... | | |
| 14 | 1 | 10 |
| 15 | 3 | 5 |
| ... | | |
| 623 | 89 | 97 |
| 624 | 90 | 92 |
| 625 | 90 | 93 |
| ... | | |
| 630 | 90 | 98 |

The flight listing area contains flight information for individual flights that satisfy the search criterion. In this example, the flight information is ordered based on fare. The results-for area illustrates the departure and return location and date and the number of passengers. The price range area provides a slider so that the user can add a maximum fare to the search criterion. The stops area provides checkboxes so that the user can add the desired number of stops to the search criterion. The airlines area provides checkboxes so that the user can indicate airlines to add to the search criterion. The interval area indicates the lowest fare for various intervals of the departure date or return date.

Figure 3:
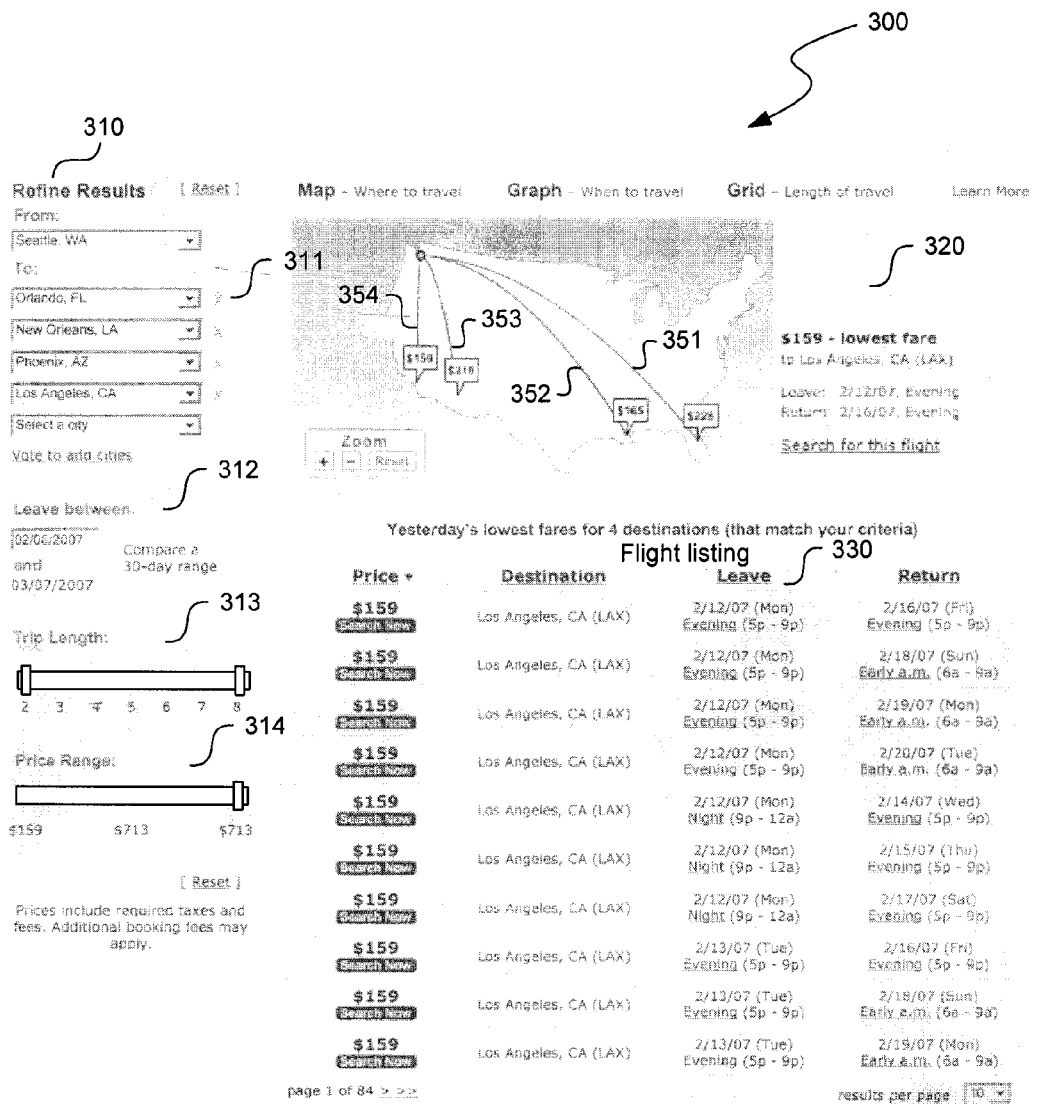
FIG. 3 is a diagram that illustrates a display page showing a route map in one embodiment.

FIG. 3 is a diagram that illustrates a display page showing a route map in one embodiment. Display page 300 includes a refine results area 310, a route map 320, and a flight listing area 330. The refine results area includes a from-and-to area 311, a leave-between area 312, a trip length area 313, and a price range area 314. The from-and-to area illustrates the currently selected departure location and destinations and includes a drop-down list for a user to select a departure location and one or more destinations for the search criterion. In this example, the departure location is Seattle, and the destinations are Orlando, New Orleans, Phoenix, and Los Angeles. The travel information system may allow the user to select any number of destinations. The leave-between area allows the user to specify the range of departure dates for the search criterion. In this example, the user is allowed to enter the first departure date for a 30-day range for the search criterion. One skilled in the art will appreciate that the flight information system could provide greater flexibility in the specifying of departure dates. For example, the flight information system may allow a user to specify the number of days in the range or may display a calendar so that the user could select noncontiguous days. The trip length area includes a slider that allows the user to specify a range of durations for the search criterion. In this example, the duration of between 2 and 8 days is selected. The price range area includes a slider that allows the user to indicate the maximum fare to the search criterion. The route map includes a map of a geographic area encompassing the departure location and the destinations of the search criterion. The route map includes route lines 351-

354 from the departure location to the destinations. The travel information system displays at each destination an indication of the lowest fare associated with that destination. For example, the lowest fare for a flight from Seattle to Orlando is $228. The travel information system may use the flight information in the observation store or current flight information to generate the route map. If the flight information system uses the flight information of the observation store, the displayed fares represent the lowest fares of the last observation date. The flight listing area includes a listing for each flight that satisfies the search criterion ordered by fare. Each listing includes a "Search Now" button. When the user selects the button, the flight information system retrieves and displays the current flight information for the corresponding flight.

Figure 4:
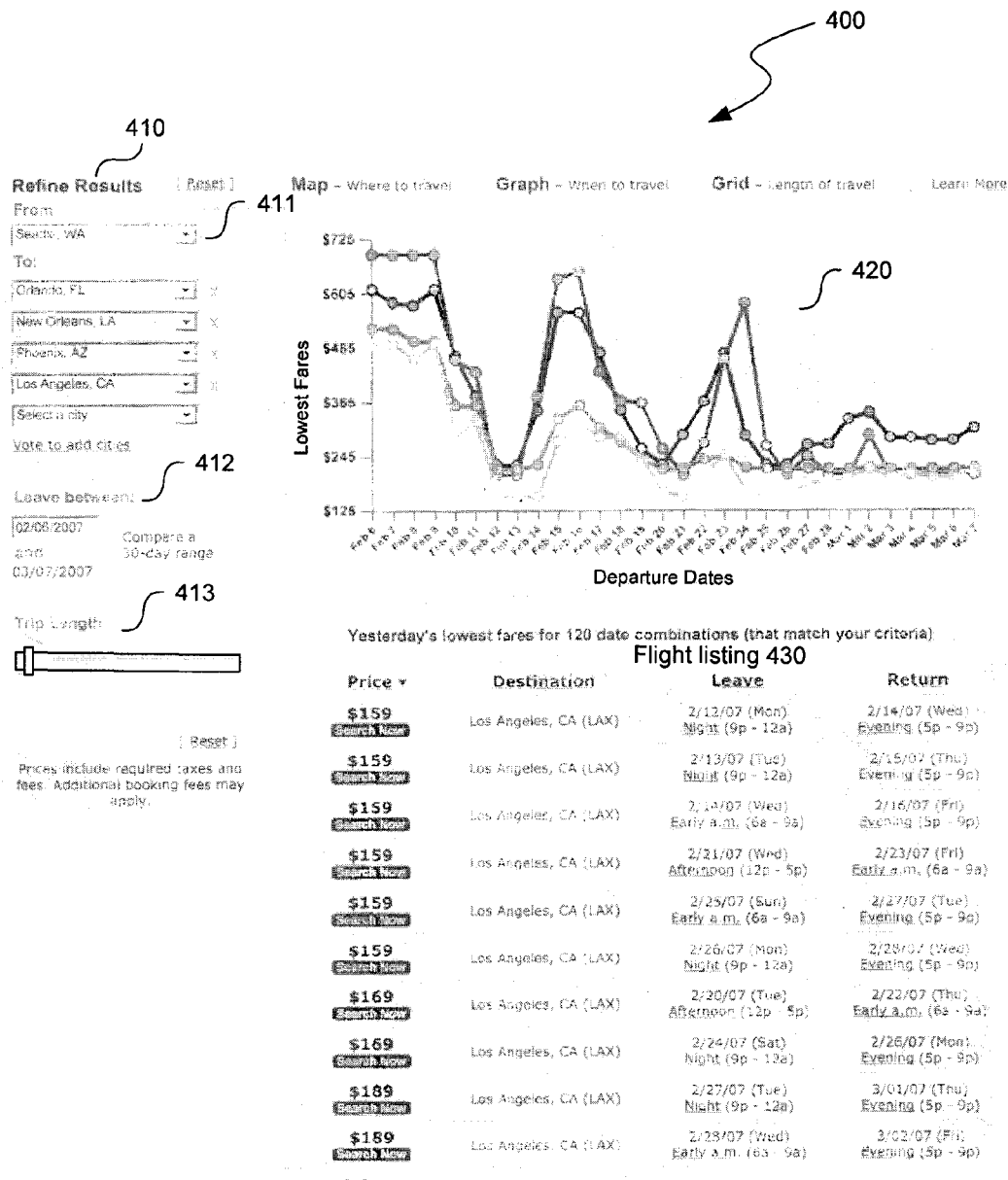
FIG. 4 is a diagram that illustrates a future fare graph in one embodiment.

FIG. 4 is a diagram that illustrates a future fare graph in one embodiment. Display page 400 includes a refine results area 410, a future fare graph 420, and a flight listing area 430. The refine results area includes a from-and-to area 411, a leave-between area 412, and a trip length area 413, which provide functionality similar to that described in reference to FIG. 3. The fare graph includes a line for each destination that plots the lowest fare to that destination on flights that satisfy the search criterion on various observation dates. In this example, the observation dates range from February 6 through March 7 and the lowest fares range from $159 to $720. The travel information system creates the fare graph from information in the observation store. The flight listing area includes a listing for each flight that satisfies the search criterion. The flight information of the flight listing area may be based on flight information of the observation store or current flight information.

Figure 5:
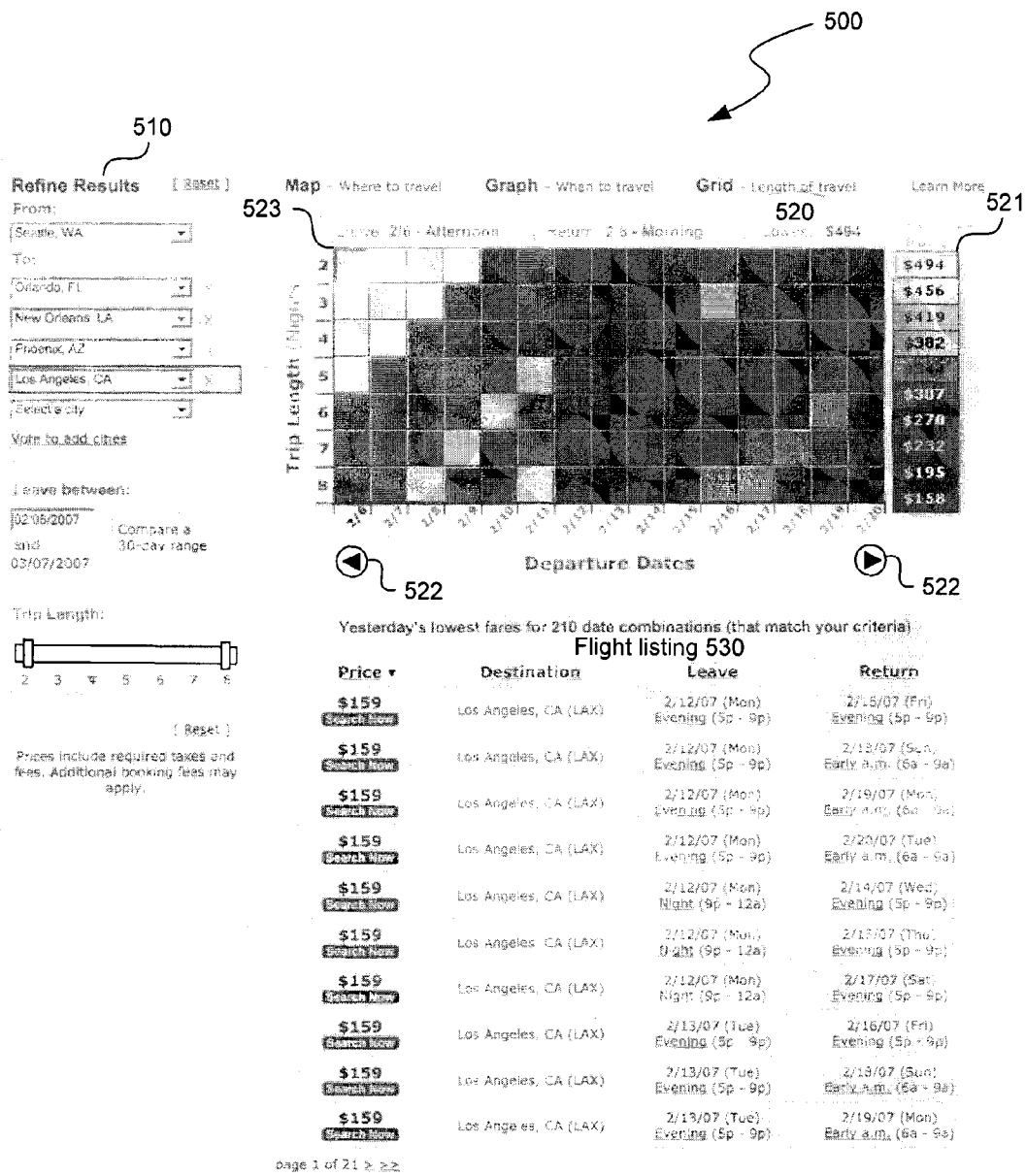
FIG. 5 is a diagram that illustrates a departure date/duration grid in one embodiment.

FIG. 5 is a diagram that illustrates a departure date/duration grid in one embodiment. Display page 500 includes a refine results area 510, a departure date/duration grid 520 and a flight listing area 530. The refine results area and the flight listing area provide functionality similar to the corresponding areas as described in reference to FIG. 4. The departure date/duration grid has a cell for each displayed departure date and duration (i.e., trip length) combination. In this example, the intensity of the color in each cell indicates the corresponding lowest fare for that departure date and duration combination for flights that satisfy the search criterion. The departure date/destination grid includes a legend area 521 that maps the intensity of the colors to their corresponding fares. The arrows 522, 532 allow a user to scroll to different departure dates. When a user selects a cell, the travel information system displays flight information associated with that cell at the top of the grid. For example, when a user selects cell 523, the travel information system indicates that the flight with the lowest fare for that departure date and duration combination leaves on February 6 in the afternoon, returns on February 8 in the morning, and has a lowest fare of $494.

Figure 6:
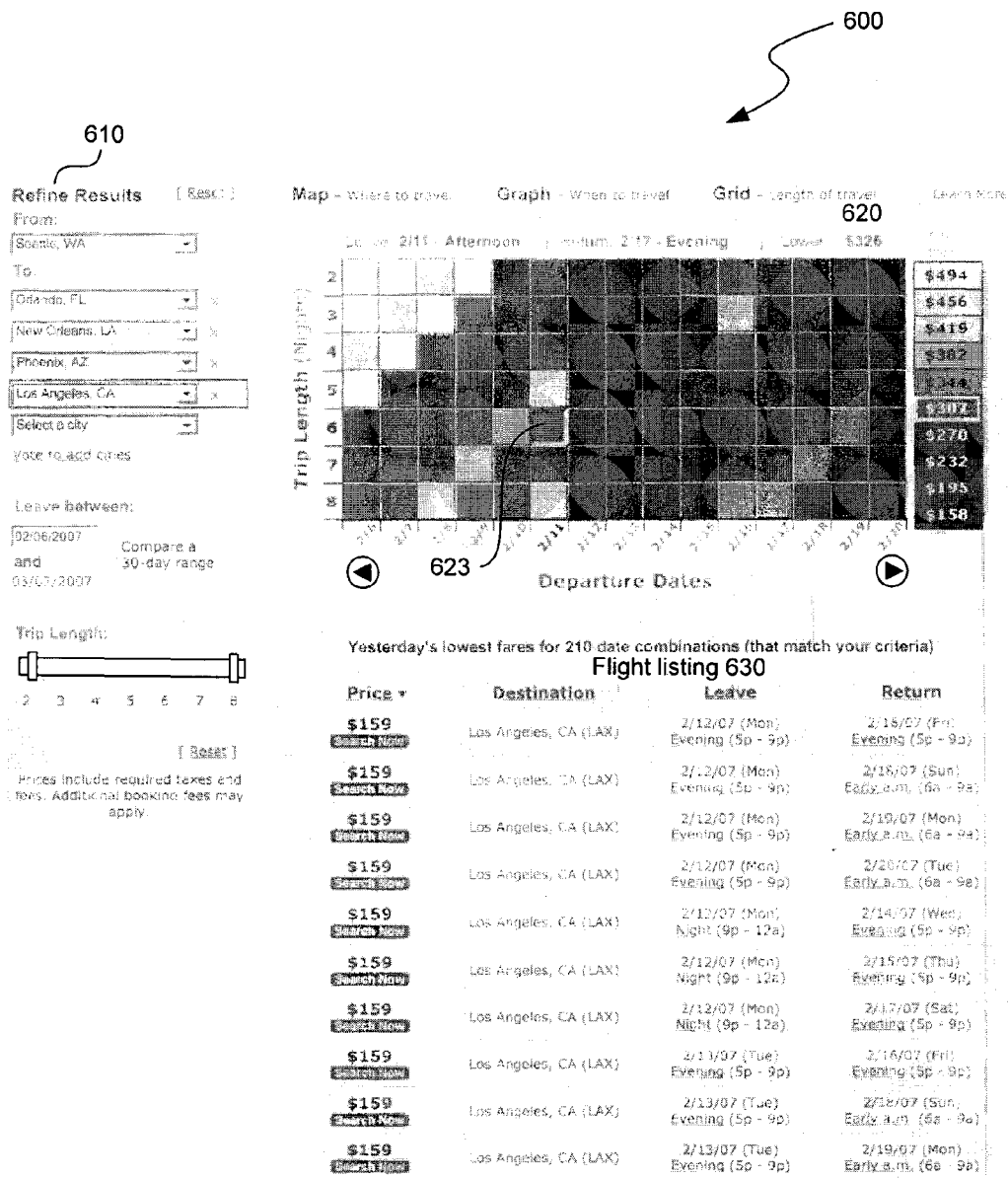
FIG. 6 is a diagram that illustrates a departure date/duration grid with a different cell selected in one embodiment.

FIG. 6 is a diagram that illustrates a departure date/duration grid with a different cell selected in one embodiment. Display page 600 includes a refine results area 610, a departure date/duration grid 620, and a flight listing area 630. The refine results area and the flight listing area provide functionality similar to the corresponding areas as described in reference to FIG. 4. In this example, the user has selected cell 623. The travel information displays the corresponding flight information at the top of the grid indicating that the flight with the lowest fare leaves on February 11 in the afternoon, returns on February 17 in the evening, and has a fare of $326.

Figure 7:
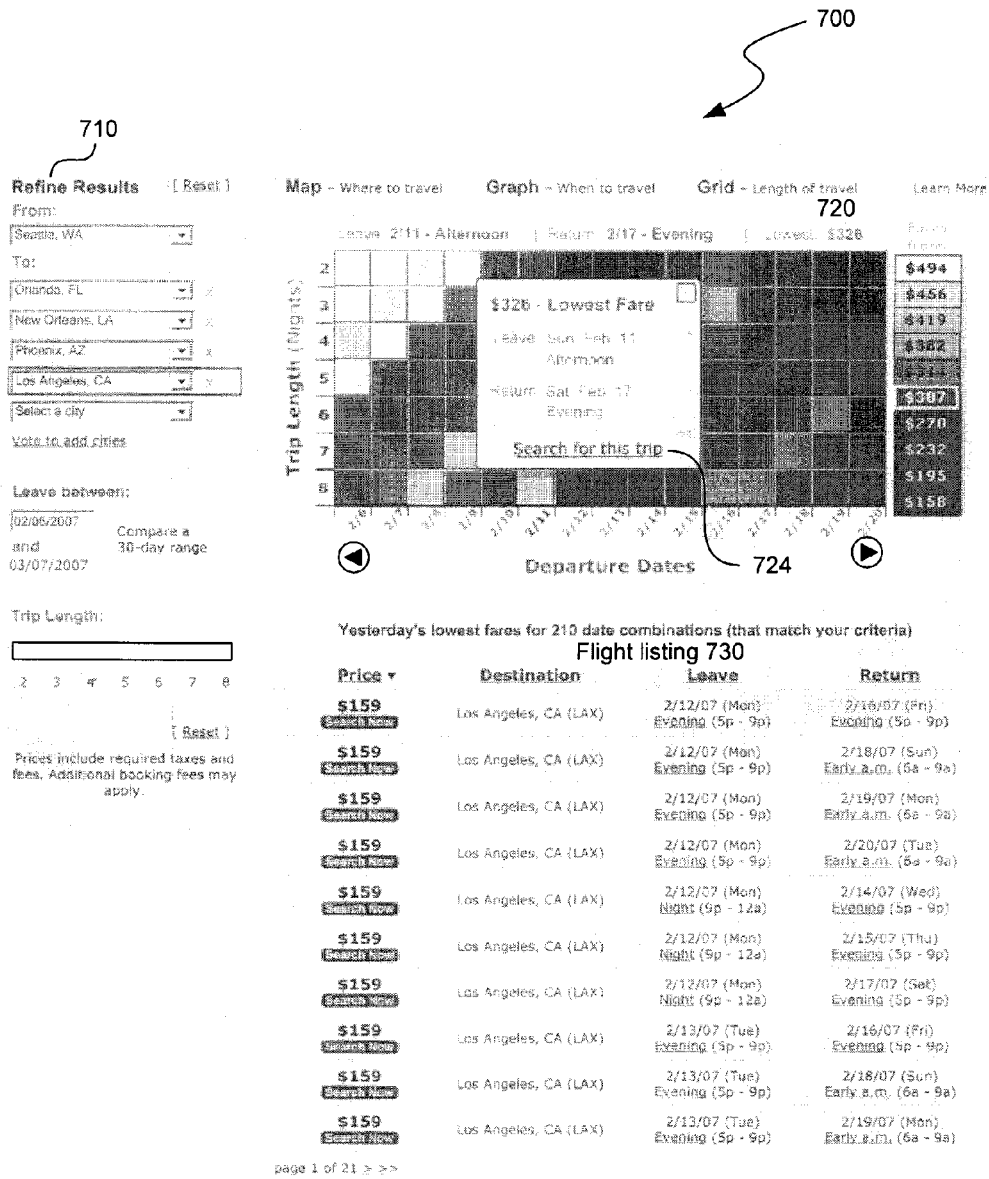
FIG. 7 is a diagram that illustrates a departure date/duration grid that allows the user to search for current flight information for the flight represented by the selected cell in one embodiment.

FIG. 7 is a diagram that illustrates a departure date/duration grid that allows the user to search for current flight information for the flight represented by the selected cell in one embodiment. Display page 700 includes a refine results area 710, a departure date/duration grid 720, and a flight listing area 730. The refine results area and the flight listing area provide functionality similar to the corresponding areas as described in reference to FIG. 4. The departure date/duration grid includes a pop-up 724 that is displayed when a user double-clicks on a cell. The pop-up displays flight information for the flight corresponding to the cell and allows the user to search for current flight information for the represented flight.

Figure 8:
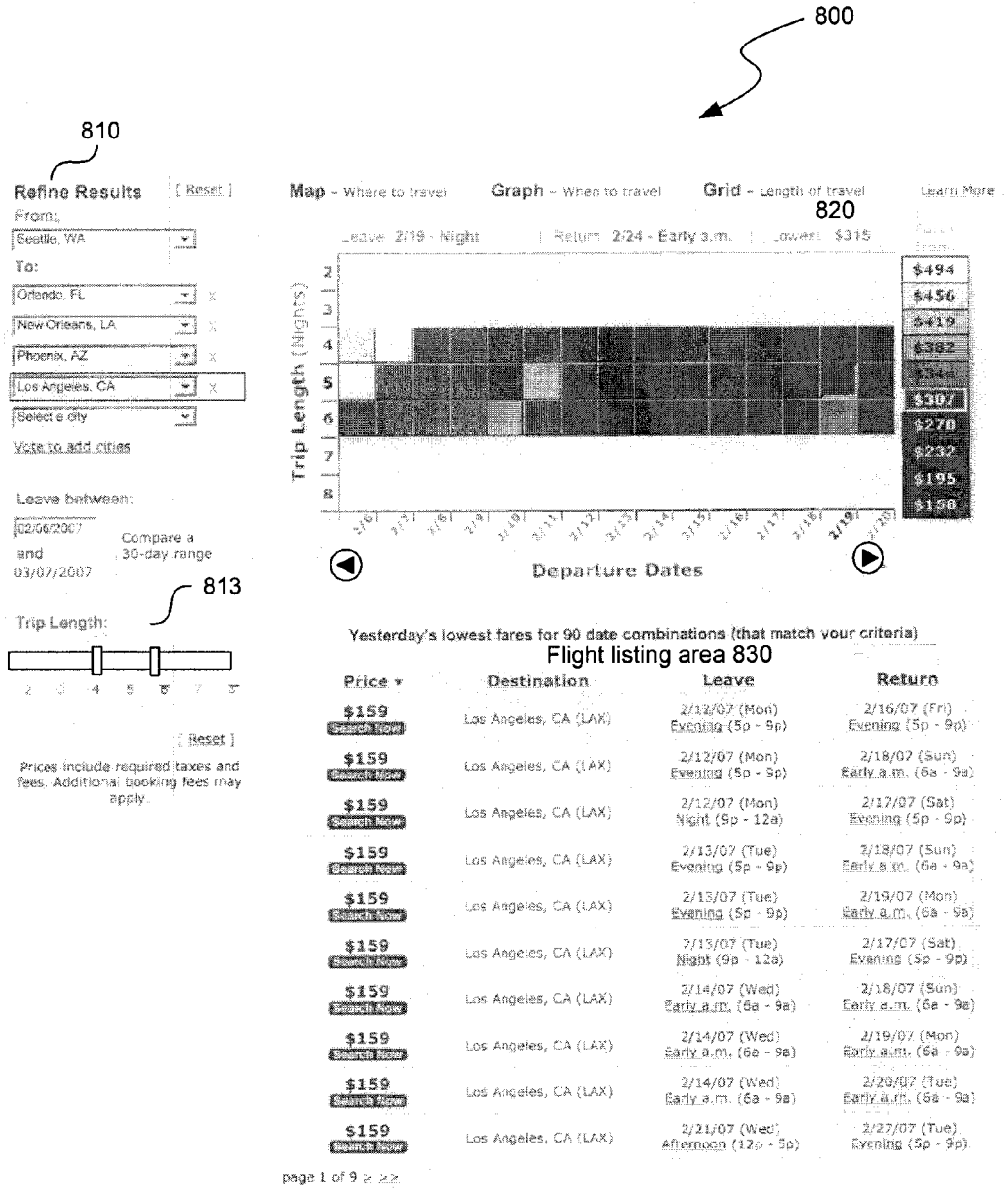
FIG. 8 is a diagram that illustrates a departure date/duration grid that allows the user to change the duration range of the search criterion in one embodiment.

FIG. 8 is a diagram that illustrates a departure date/duration grid that allows the user to change the duration range of the search criterion in one embodiment. Display page 800 includes a refine results area 810, a departure date/duration grid 820, and a flight listing area 830. The refine results area and the flight listing area provide functionality similar to the corresponding areas as described in reference to FIG. 4. The trip length area 813 indicates that the user has specified the duration range to be between four and six days. The flight information system displays a duration date/grid that includes flight information for flights of that duration range.

Figure 9:
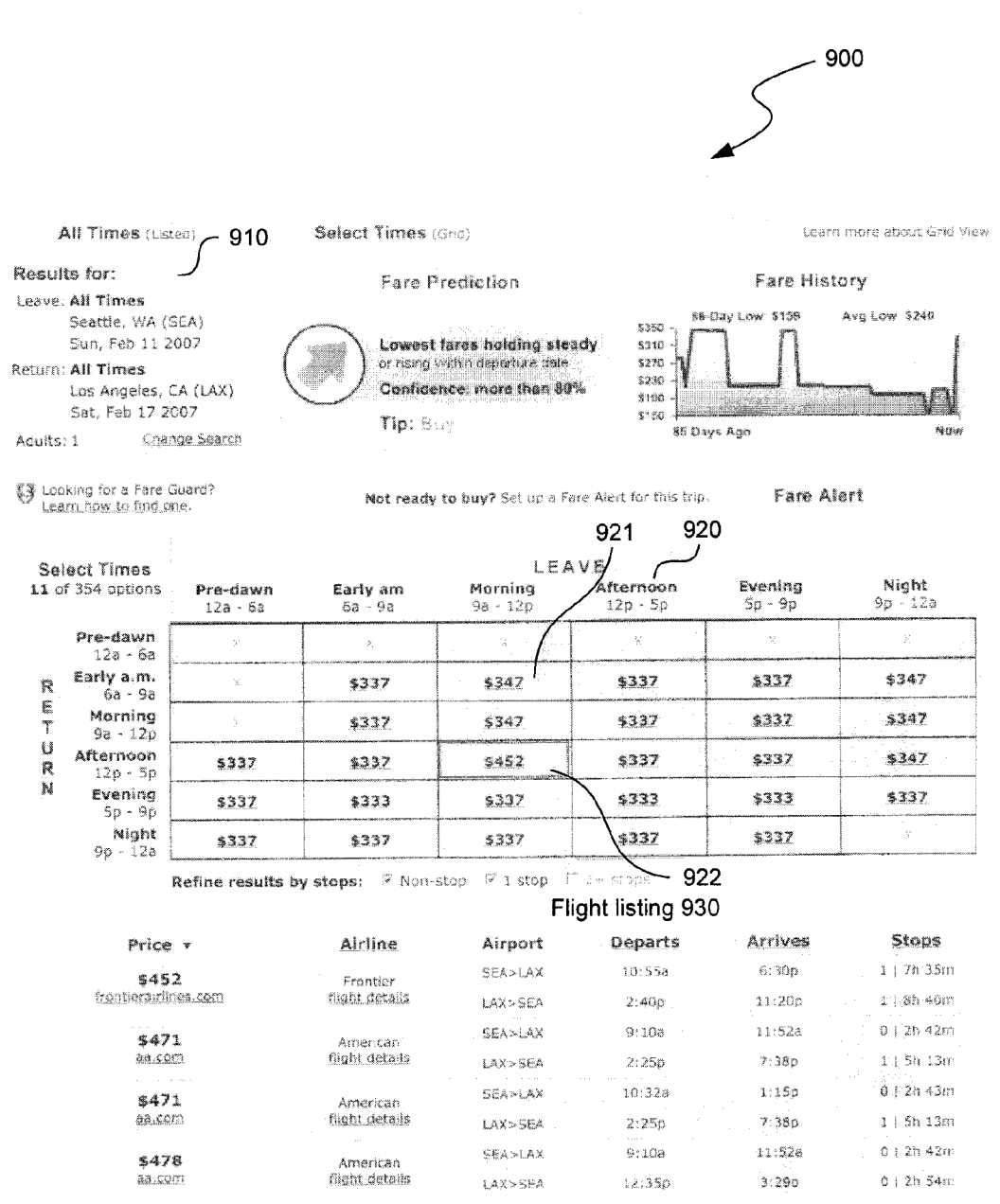

FIG. 9 is a diagram that illustrates an interval grid in one embodiment. Display page 900 includes a results-for area 910, an interval grid 920, and a flight listing area 930. The results-for area indicates the search criterion. The interval grid contains a column for each interval for the departure date and a row for each interval of the return date. The content of the cell of a row and column indicates the corresponding lowest fare for flights that satisfy the search criterion with a departure time within the departure interval and a return time within the return interval. For example, cell 921 indicates that the lowest fare for a flight that leaves between 9 a.m. and 12 p.m. and returns between 6 a.m. and 9 a.m. is $347. The flight listing area typically contains a listing of each flight that satisfies the search criterion. When a user selects a cell of the grid, the travel information system effectively adds the corresponding intervals to the search criterion and updates the flight listing area to include flight information for only those flights with departure and return times within the departure and return intervals of the cell. For example, if the user selects cell 922, then the flight listing area is updated accordingly. A user may select the "All Times" tab to remove the intervals specification from the search criterion.

A travel information system can also be used to present hotel-related information in various formats. The hotel rooms for a particular hotel market (e.g., city and hotel rating) may be aggregated in a similar manner to the way in which the airline flight information for a flight market (e.g., departure location and return location combination) is aggregated. For example, the four star hotels in New York City can represent one market, the one star hotels in New York City can represent another market, the four star hotels in Las Vegas can represent yet another market, and so on. The hotel markets could further be divided into type of room (e.g., single king-size bed, two double beds, suite). Alternatively, the type of room could simply be a feature of the feature vector representing hotel rooms in the market. The travel information system can collect hotel information on a daily or other basis for various stays in each market similar to the way in which information for airline trips is collected. A stay may be a particular arrival and departure date combination for a market. For example, one stay may be arriving on January 1 and departing on January 5 for a four star hotel in New York City, another stay may be arriving on January 1 and leaving on January 3 for a four star hotel in New York City, and yet another stay may be arriving on January 1 and departing on January 5 for a one star hotel in Las Vegas. The travel information system may display hotel information using a future fare graph, a departure date duration grid, a route map, and a fare history graph where the fare corresponds to the price of a hotel room or a per night average.

Figure 10:
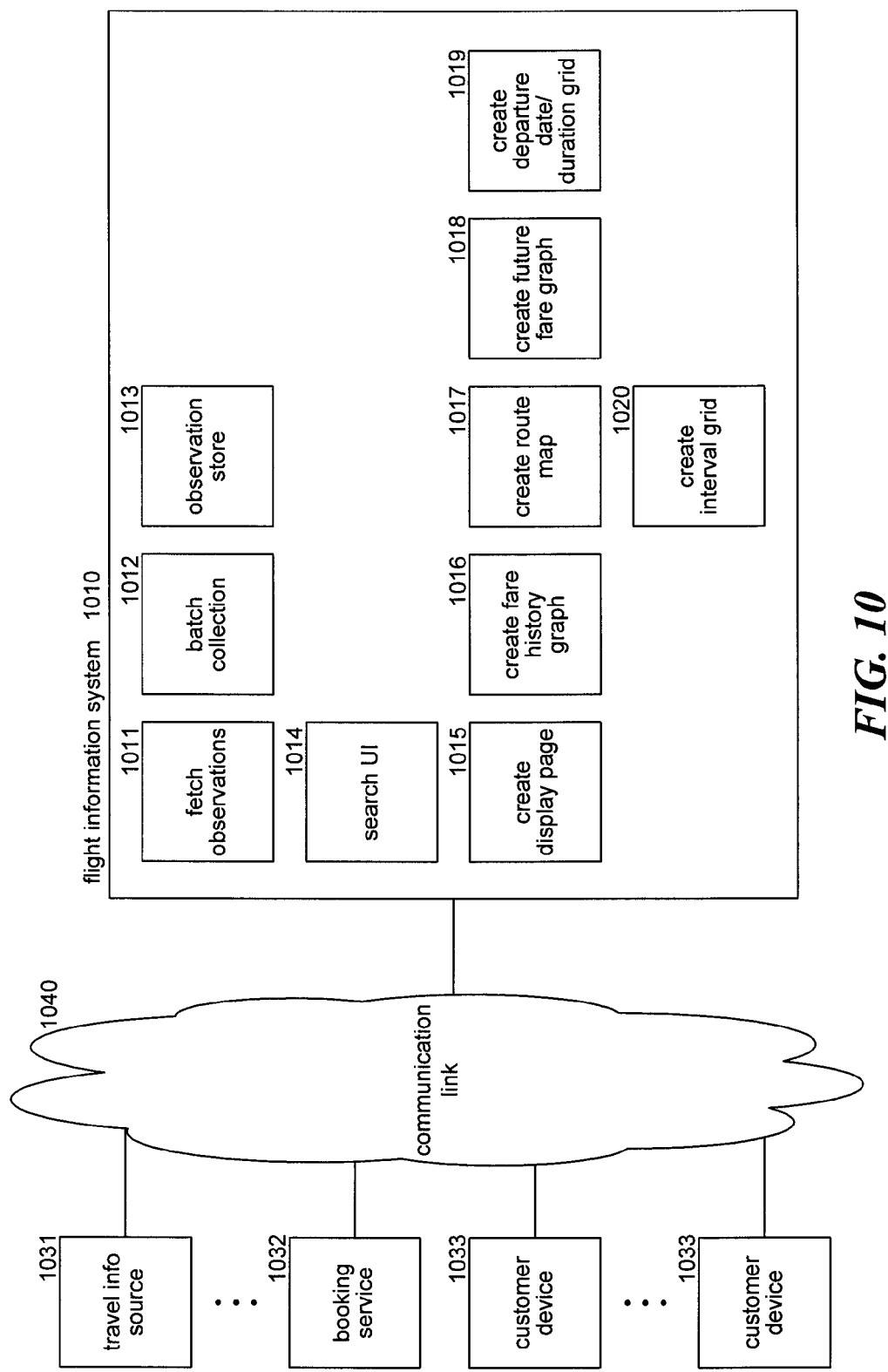
FIG. 10 is a block diagram that illustrates components of the flight information system in one embodiment.

FIG. 10 is a block diagram that illustrates components of the flight information system in one embodiment. The flight information system 1010 may be connected to various travel information sources 1031, booking services 1032, and customer devices 1033 via a communications link 1040. The flight information system includes a fetch observations component 1011, a batch collection component 1012, and an observation store 1013. The fetch observations component collects current observations from travel information sources. The batch collection component invokes the fetch observations component on a periodic basis to collect the current flight information for a variety of flights. As discussed above, the flight information system may collect flight information for all flights with departure dates within the next 90 days and with durations of between two and eight days. The batch collection component stores the current flight information in the observation store and with an associated observation date.

The flight information system also includes a search user interface component 1014, a create display page component 1015, a create fare history graph component 1016, a create route map component 1017, a create future fare graph component 1018, a create departure date/duration grid component 1019, and a create interval grid component 1020. The search user interface component receives a search criterion, collects flight information for flights that satisfy the search criterion, and invokes the create display page component to create a display page for displaying the flight information in various formats. The create display page component invokes the create fare history graph component to create a fare history graph, the create route map component to create a route map, the create future fare graph component to create a future fare graph, the create departure date/duration grid component to create a departure date/duration grid, and the create interval grid component to create an interval grid.

The computing devices on which the flight information system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the flight information system. In addition, the data structures may be stored or transmitted via a data transmission medium, such as a signal on a communications link. Various communications links may be used to connect the flight information system to flight information sources and user computing devices, such as the Internet, a local area network, a wide area network, a point-to-point dial-up connection, a cell phone network, and so on.

Embodiments of the flight information system may be implemented in various operating environments that include personal computers, server computers, multiprocessor systems, microprocessor-based systems, minicomputers, mainframe computers, distributed computing environments that include any of the above systems or devices, and so on. The user devices may include cell phones, personal digital assistants, smart phones, personal computers, programmable consumer electronics, digital cameras, and so on.

The flight information system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the functions of batch collection and providing the user interface may be performed on different computer systems.

Figure 11:
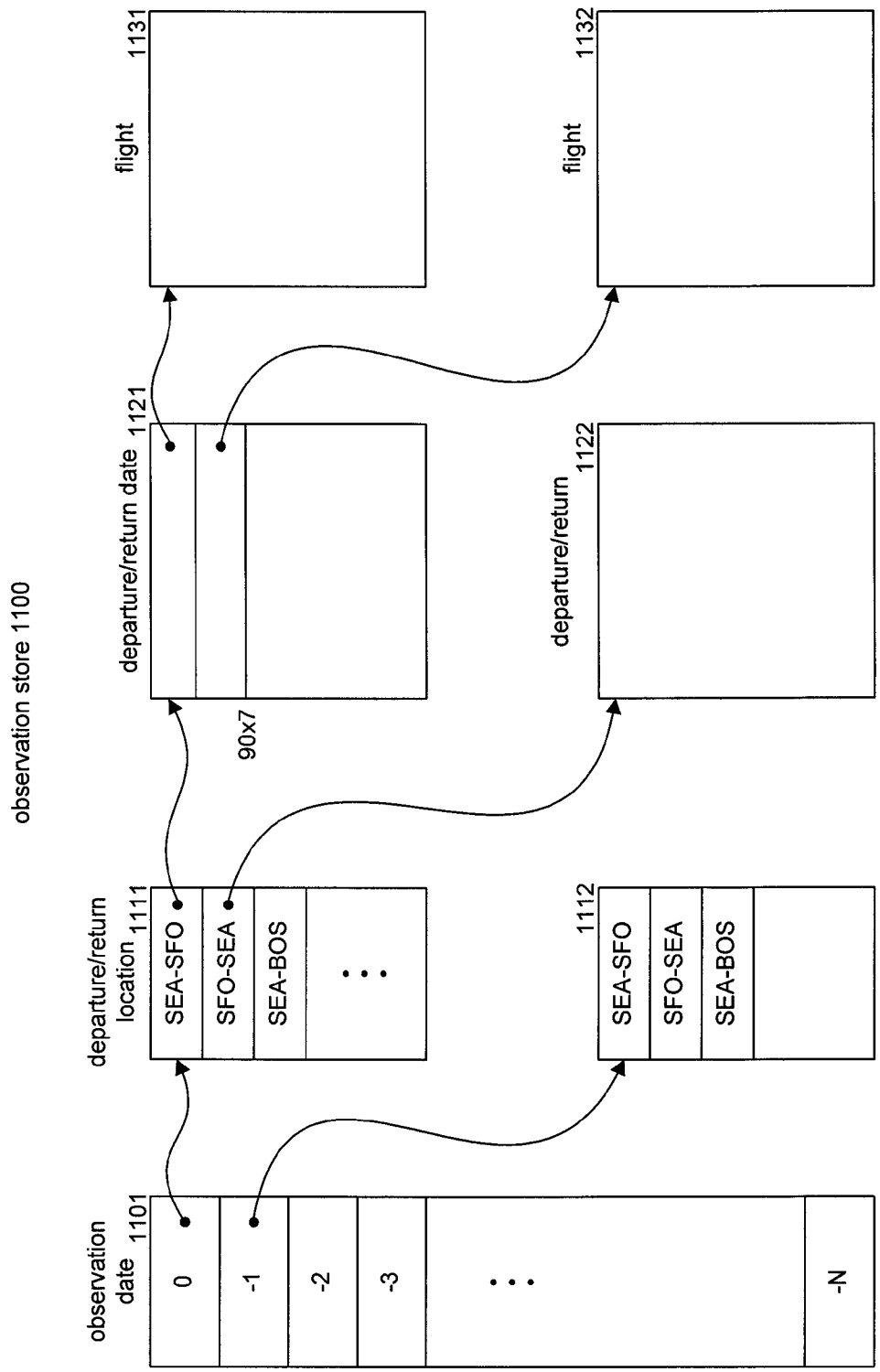
FIG. 11 is a block diagram that illustrates data structures of the observation store in one embodiment.

FIG. 11 is a block diagram that illustrates data structures of the observation store in one embodiment. The observation store 1100 includes an observation date table 1101 that contains an entry for each observation date starting with the most current observation date. Each entry contains a reference to a departure/return location table 1111-1112. Each departure/return location table contains an entry for each departure location and return location combination that contains a reference to a departure/return date table 1121-1122. Each departure/return date table contains an entry for each possible trip with the associated departure/return location. A trip represents a unique combination of departure date and return date for a departure location and return location combination. Each entry identifies the departure/return date of the trip and contains a reference to a flight table 1131-1132. Each flight table contains an entry for each flight for the trip identified by the associated departure and return location and date. Each entry of the flight table may contain the raw flight information collected from a flight information source by the fetch observations component.

Figure 12:
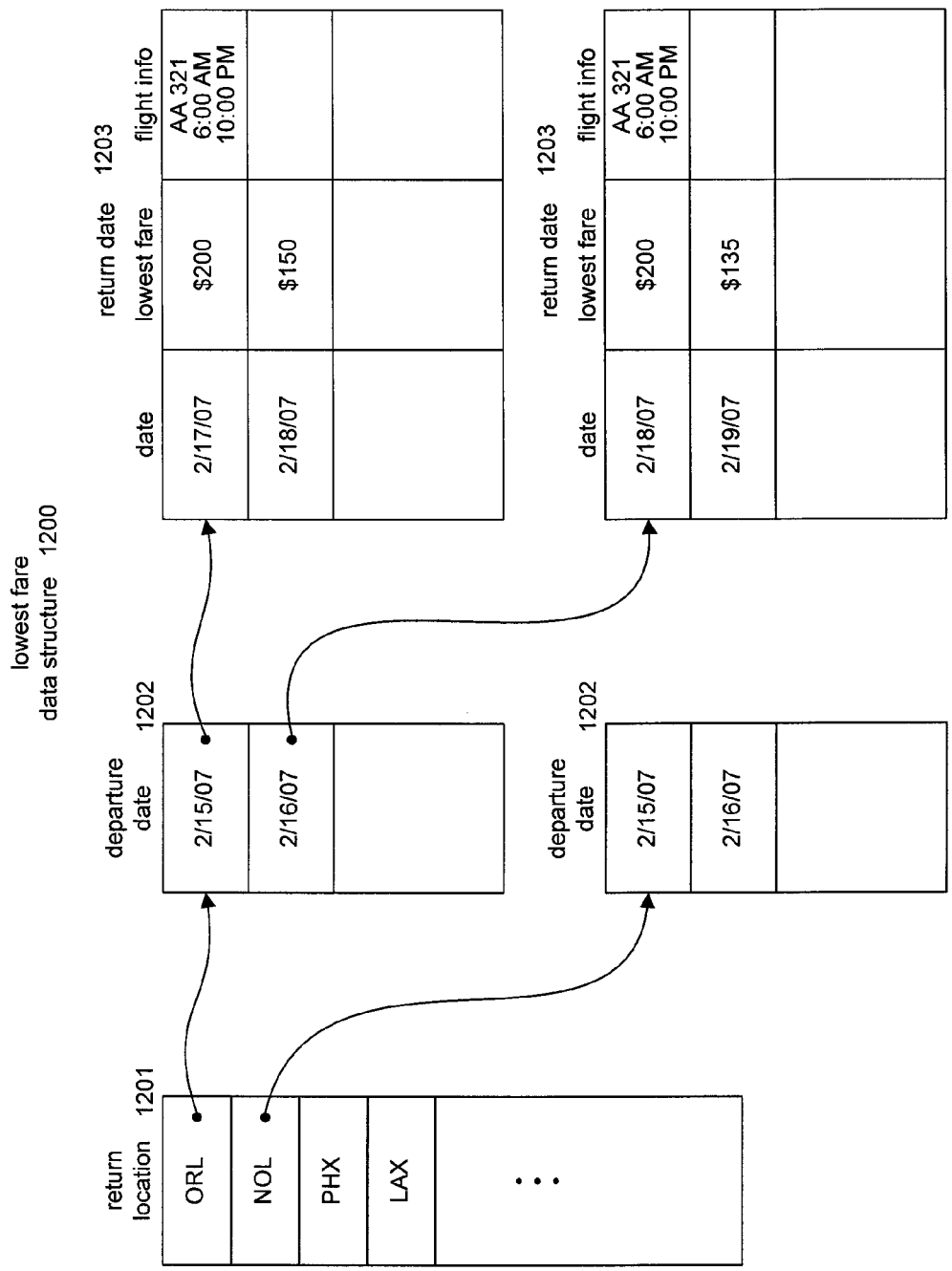
FIG. 12 is a block diagram that illustrates a lowest fare data structure of the flight information system in one embodiment.

FIG. 12 is a block diagram that illustrates a lowest fare data structure of the flight information system in one embodiment. A lowest fare data structure 1200 represents flight information for flights satisfying a criterion and is used by the flight information system to generate the various formats of the flight information. The lowest fare data structure includes a return location table 1201. The return location table includes an entry for each return location of the criterion that contains a reference to a departure date table 1202. Each departure date table includes an entry for each possible departure date of the criterion that contains a date and a reference to a return date table 1203. Each return date table includes an entry for each possible return date of the criterion along with an indication of the associated lowest fare and flight information associated with the flight having the lowest fare.

Figure 13:
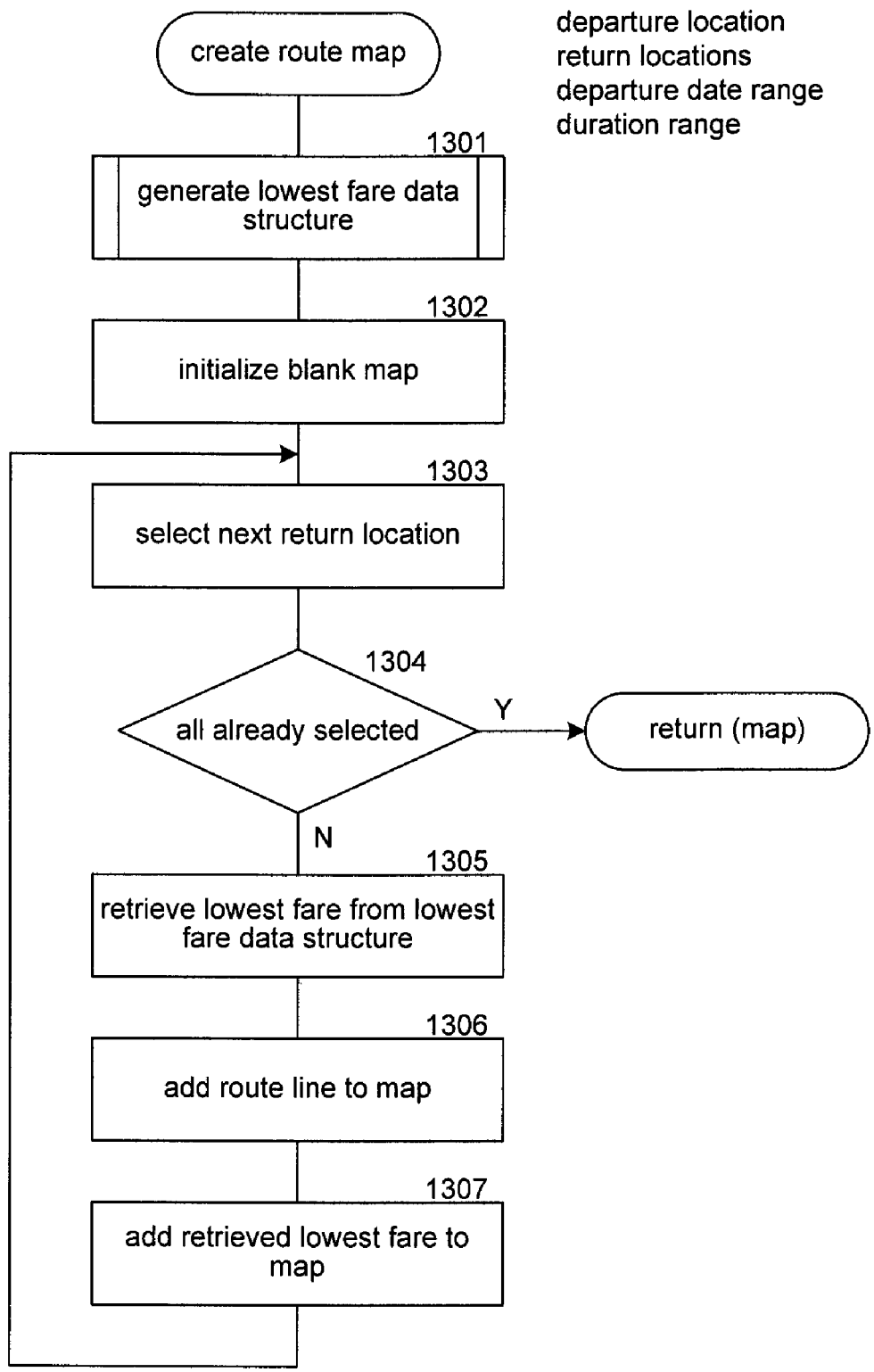
FIG. 13 is a flow diagram that illustrates the processing of the create route map component of the flight information system in one embodiment.

FIG. 13 is a flow diagram that illustrates the processing of the create route map component of the flight information system in one embodiment. The component generates a route map based on passed information. The passed information includes a departure location, return locations, a departure date range, and a duration range. In block 1301, the component invokes the generate lowest fare data structure component to collect the flight information needed to create the route map. In block 1302, the component initializes the route map. In blocks 1303-1307, the component loops adding route lines to the map. In block 1303, the component selects the next return location. In decision block 1304, if all the return locations have already been selected, then the component returns the map, else the component continues at block 1305. In block 1305, the component retrieves the lowest fare for the selected return location from the lowest fare data structure. In block 1306, the component adds a route line to the map from the destination location to the selected return location. In block 1307, the component adds an indication of the retrieved lowest fare to the map near the selected return location. The component then loops to block 1303 to select the next return location.

Figure 14:
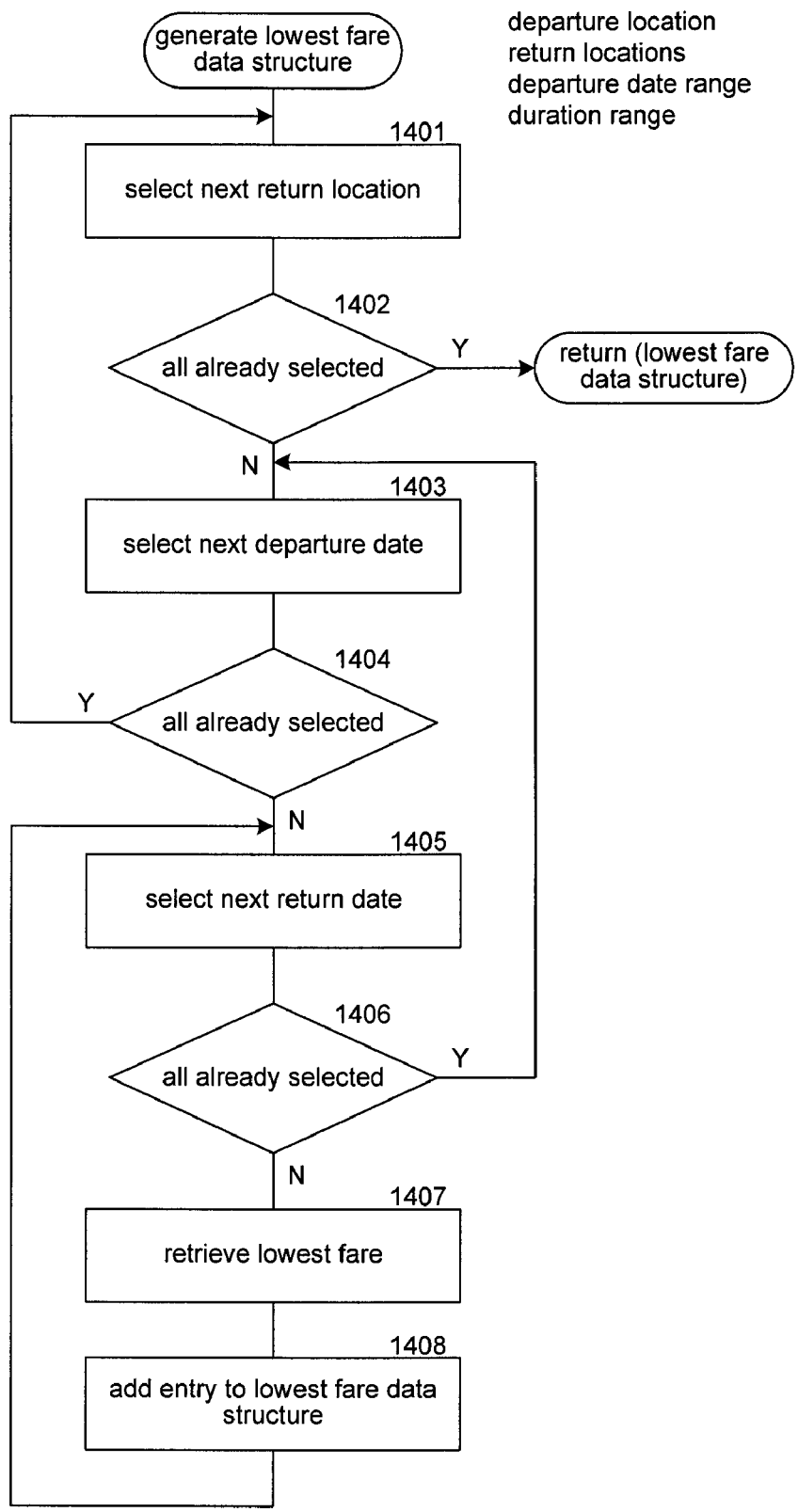
FIG. 14 is a flow diagram that illustrates the processing of the generate lowest fare data structure component of the flight information system in one embodiment.

FIG. 14 is a flow diagram that illustrates the processing of the generate lowest fare data structure component of the flight information system in one embodiment. The component is passed a departure location, return locations, a departure date range, and a duration range and collects flight information for flights that satisfy the criterion of the passed information. In block 1401, the component selects the next return location. In decision block 1402, if all the return locations have already been selected, then the component returns the lowest fare data structure, else the component continues at block 1403. In block 1403, the component selects the next departure date. In decision block 1404, if all the departure dates have already been selected, then the component loops to block 1401 to select the next return location, else the component continues at block 1405. In block 1405, the component selects the next return date for the selected return location. In decision block 1406, if all such return dates have already been selected, then the component loops to block 1403 to select the next departure date, else the component continues at block 1407. In block 1407, the component retrieves the lowest fare for a flight with the departure location, the selected return location, the selected departure date, and the selected return date combination. In block 1408, the component adds an entry to the lowest fare data structure and then loops to block 1405 to select the next return date.

Figure 15:
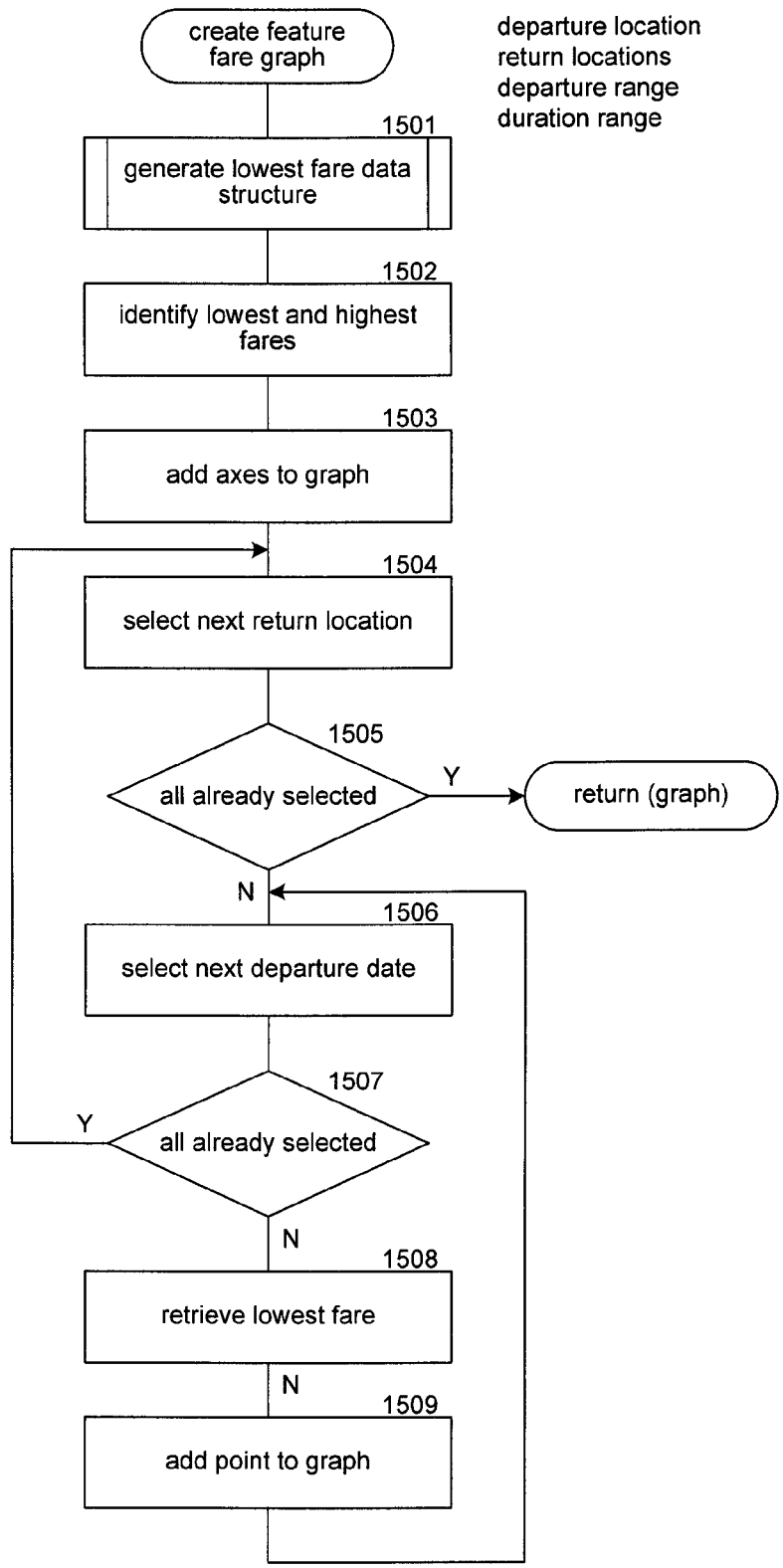
FIG. 15 is a flow diagram that illustrates the processing of the create future fare graph component of the flight information system in one embodiment.

FIG. 15 is a flow diagram that illustrates the processing of the create future fare graph component of the flight information system in one embodiment. The component is passed a departure location, return locations, a departure range, and a duration range. The component creates a future fare graph based on flights that satisfy the criterion of the passed information. In block 1501, the component invokes the generate lowest fare data structure component to retrieve flight information that satisfies the criterion. In block 1502, the component identifies the lowest and highest fares from the data structure. In block 1503, the component adds a vertical fare axis and a horizontal departure date axis to the graph. In blocks 1504-1509, the component loops adding plot lines for each return location to the graph. In block 1504, the component selects the next return location. In decision block 1505, if all return locations have already been selected, then the component returns the graph, else the component continues at block 1506. In block 1506, the component selects the next departure date. In block 1507, if all the departure dates have already been selected for the selected return location, then the component loops to block 1504 to select the next return location, else the component continues at block 1508. In block 1508, the component retrieves the lowest fare for flights represented in the data structure for the departure location, the selected return location, and the selected departure date combination. In block 1509, the component adds a point to the plot line for the selected return location and for the selected departure date and then loops to block 1506 to select the next departure date.

Figure 16:
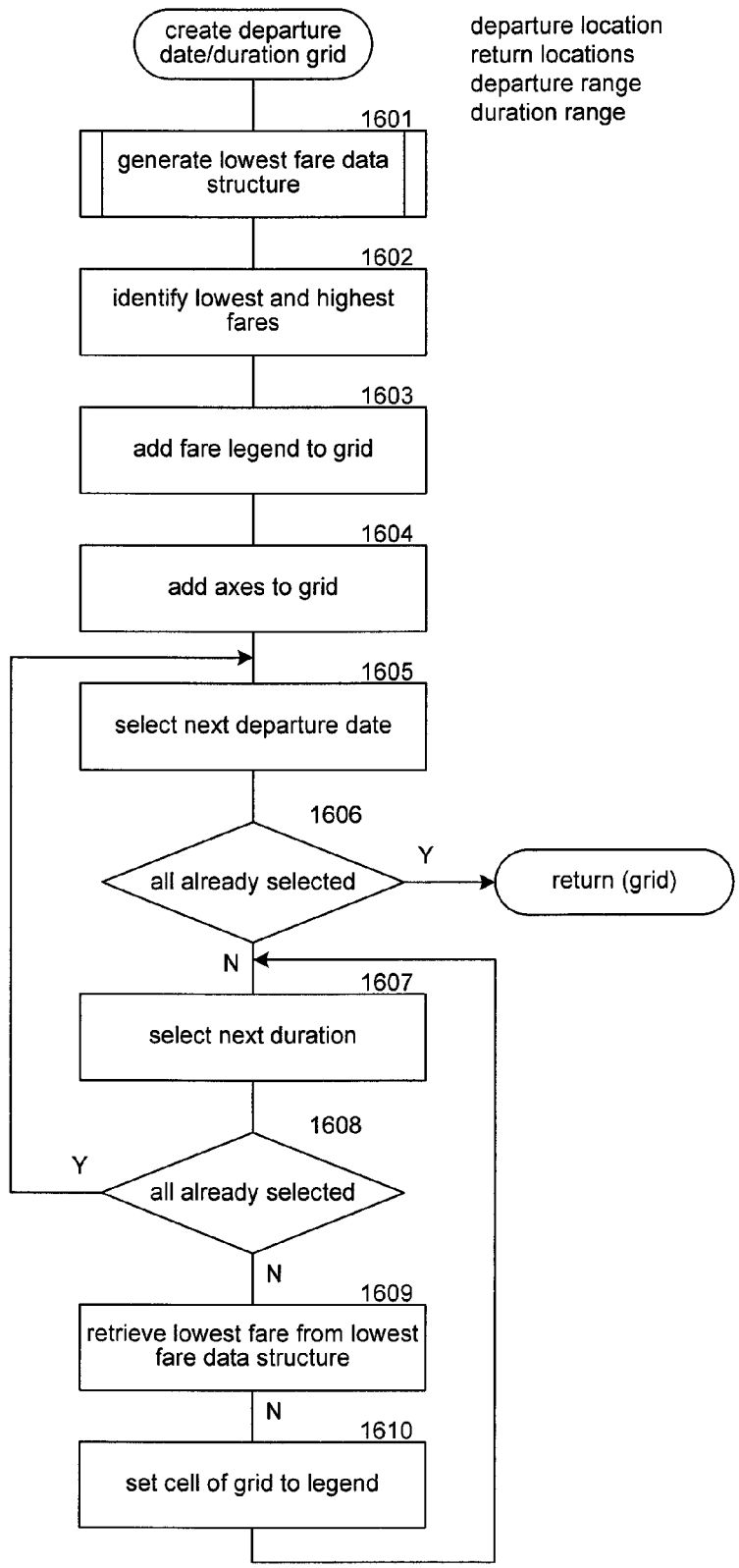
FIG. 16 is a flow diagram that illustrates the processing of the create departure date/duration grid component of the flight information system in one embodiment.

FIG. 16 is a flow diagram that illustrates the processing of the create departure date/duration grid component of the flight information system in one embodiment. The component is passed a departure location, return locations, a departure range, and a duration range. The component generates the departure date/duration grid based on flight information that matches the criterion of the passed information. In block 1601, the component invokes the generate lowest fare data structure component to retrieve flight information that satisfies the criterion. In block 1602, the component identifies the lowest and highest fares represented by the data structure. In block 1603, the component adds a fare legend to the grid indicating intensity levels that correspond to fare levels. In block 1604, the component adds a vertical duration axis and a horizontal departure date axis to the grid. In blocks 1605-1610, the component loops coloring in the cells of the grid. In block 1605, the component selects the next departure date. In decision block 1606, if all the departure dates have already been selected, then the component returns the grid, else the component continues at block 1607. In block 1607, the component selects the next duration for the selected departure date. In decision block 1608, if all of the durations have already been selected, then the component loops to block 1605 to select the next departure date, else the component continues at block 1609. In block 1609, the component retrieves the lowest fare from the lowest fare data structure for the selected departure date and the selected duration. In block 1610, the component sets the color of the cell corresponding to the selected departure date and the selected duration according to the color indicated by the grid legend and then loops to block 1607 to select the next duration.

Figure 17:
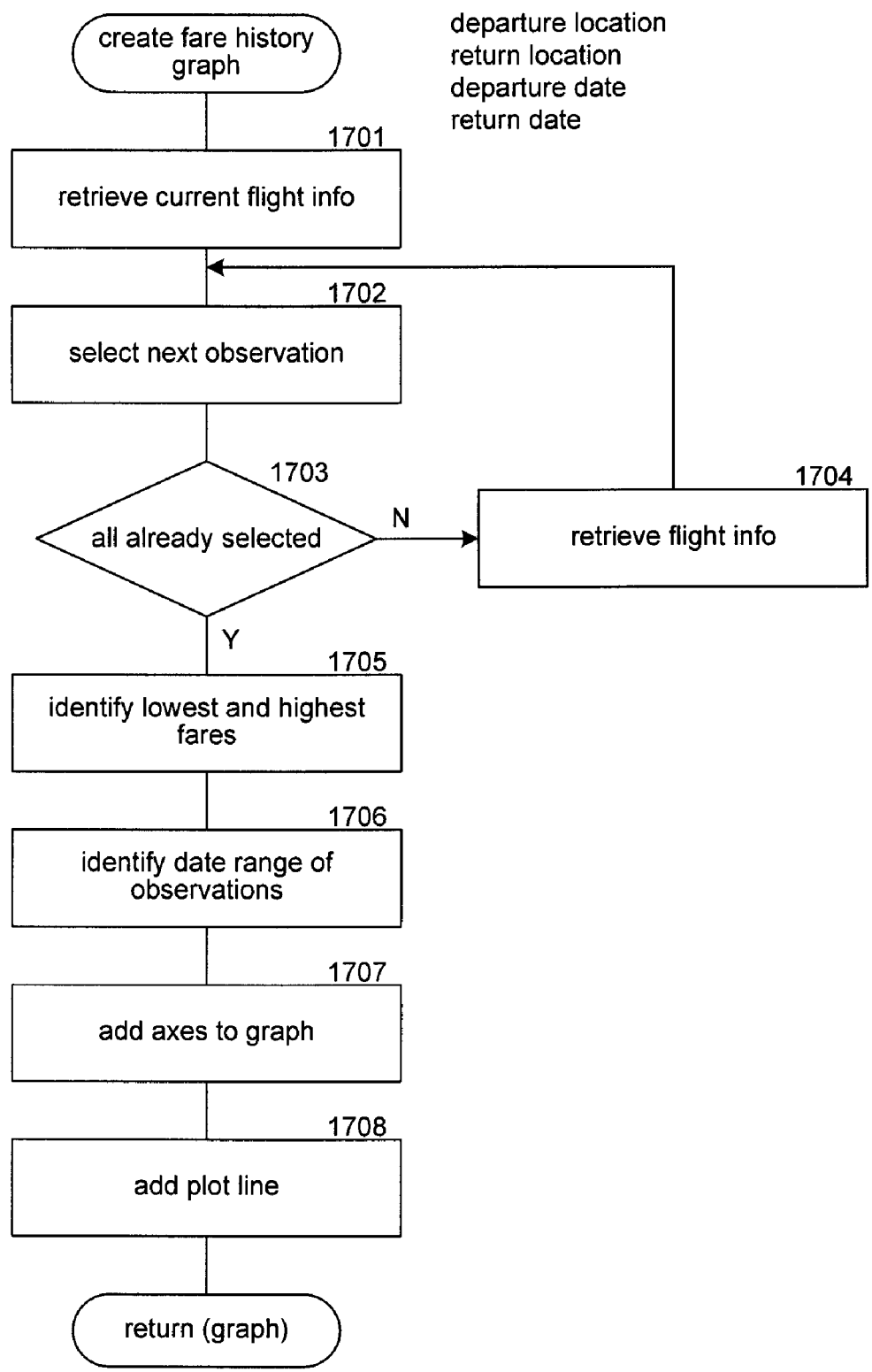
FIG. 17 is a flow diagram that illustrates the processing of the create fare history graph component of the flight information system in one embodiment.

FIG. 17 is a flow diagram that illustrates the processing of the create fare history graph component of the flight information system in one embodiment. The component is passed a departure location, a return location, a departure date, and a return date. The component creates a fare history graph covering various observation dates for flights that satisfy the criterion of the passed information. In block 1701, the component retrieves current flight information for flights that satisfy the criterion. In blocks 1702-1704, the component loops retrieving flight information for flights that satisfy the criterion. In block 1702, the component selects the next observation that includes flights that satisfy the criterion from the observation store. In block 1703, if all such observations have already been selected, then the component continues at block 1704, else the component continues at block 1705. In block 1704, the component retrieves the flight information for the selected observation that satisfies the criterion and then loops to block 1702 to select the next observation. In block 1705, the component identifies lowest and highest fares of the retrieved information. In block 1706, the component identifies the departure date range of the observations. In block 1707, the component adds a horizontal fare axis and a vertical observation date axis to the graph. In block 1708, the component adds a plot line to the graph indicating the lowest fare for each observation date including the current date. The component then returns the graph.

Figure 18:
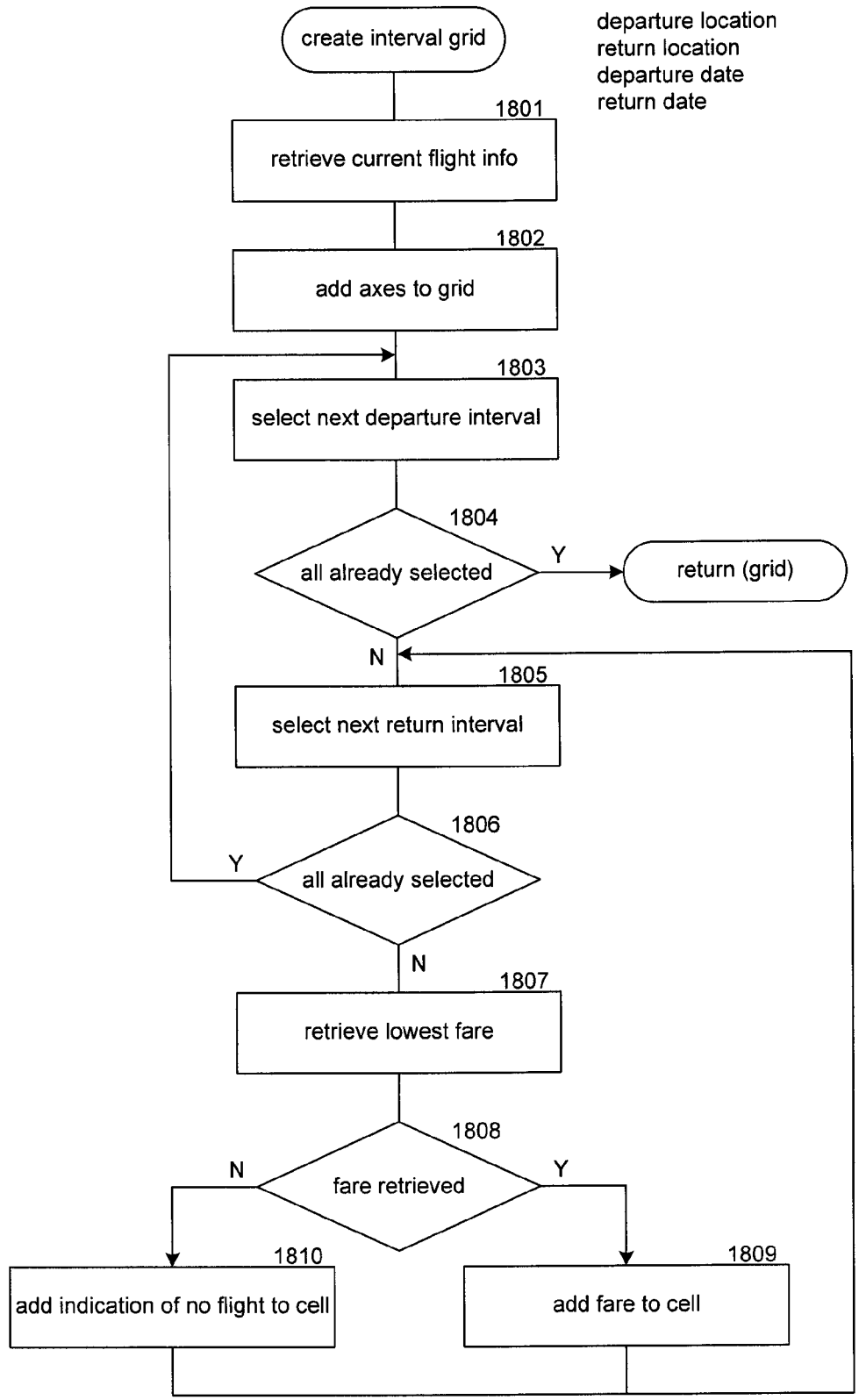
FIG. 18 is a flow diagram that illustrates the processing of the create interval grid component of the flight information system in one embodiment.

FIG. 18 is a flow diagram that illustrates the processing of the create interval grid component of the flight information system in one embodiment. The component is passed a departure location, a return location, a departure date, and a return date. The component generates an interval grid based on flight information that satisfies the criterion of the passed information. In block 1801, the component retrieves current flight information that satisfies the criterion. In block 1802, the component adds to the grid a vertical axis for the intervals of the return date and a horizontal axis for the intervals of the departure date. In blocks 1803-1810, the component loops populating the cells of the grid. In block 1803, the component selects the next departure interval. In decision block 1804, if all the departure intervals have already been selected, then the component returns the grid, else the component continues at block 1805. In block 1805, the component selects the next return interval. In decision block 1806, if all the return intervals have already been selected, then the component loops to block 1803 to select the next departure interval, else the component continues at block 1807. In block 1807, the component retrieves the lowest fare for the selected departure interval and the selected return interval. In decision block 1808, if there is at least one flight corresponding to the selected departure interval and the selected return interval, then the component continues at block 1809, else the component continues at block 1810. In block 1809, the component adds the fare to the cell corresponding to the selected departure interval and the selected return interval and then loops to block 1805 to select the next return interval. In block 1810, the component adds an indication to the cell for the selected departure interval and the selected return interval to indicate that there is no flight corresponding to that interval combination and then loops to block 1805 to select the next return interval.

From the foregoing, it will be appreciated that specific embodiments of the invention have been described herein for purposes of illustration, but that various modifications may be made without deviating from the spirit and scope of the invention. For example, the search criterion may specify a variety of attributes of airline flights such as airlines, departure locations, return locations, travel dates and times, durations, number of stops, class of service, fare level, and so on. Also, the travel information system may provide fare information other than lowest fare. For example, the fare information may be average fare, median fare, lowest and highest fare, and so on. A trip may also be considered to be a one-way trip, a round trip, or a multi-segment trip. Accordingly, the invention is not limited except as by the appended claims.

We claim:

1. A method in a computer system with a processor and a memory for presenting airline fare information, the method comprising:

receiving by the computer system from a user on a current date a search request having a search criterion, the search criterion including a combination of a departure location and date and a return location and date for airline flights for which the user is seeking to purchase a ticket;

retrieving by the computer system, for various past observation dates, past flight information for airline flights that match the search criterion, the past flight information for an airline flight including a fare for that airline flight on that past observation date, the past observation dates including at least four consecutive dates immediately prior to a current date;

retrieving by the computer system as search results current flight information for airline flights that match the search criterion, the current flight information for an airline flight including a current fare for that airline flight on the current observation date, the current observation date being the current date;

generating by the computer system a fare history graph from the retrieved flight information that illustrates the history of fares for the airline flights that match the search criterion over the observation dates that include the past observation dates and the current observation date, wherein the fare history graph includes an observation date axis and a fare axis and indicates a representative fare for the airline flights on the corresponding observation date;

sending by the computer system for presentation to the user the search results along with the generated fare history graph; and receiving from the user a request to purchase a ticket for an airline flight selected from the search results by the user.

2. The method of claim 1 including collecting on observation dates flight information for airline flights.

3. The method of claim 2 including generating trip information by aggregating the flight information for airline flights associated with a trip.

4. The method of claim 1 wherein the fare history graph illustrates the lowest fare available on an observation date for airline flights that match the search criterion.

5. The method of claim 1 wherein the search criterion includes a maximum fare.

6. The method of claim 1 including displaying fares of the current flight information at different time intervals of the departure date.

7. The method of claim 1 including displaying fares of the current flight information at different time intervals of the return date.

8. The method of claim 1 wherein the search criterion specifies a one-way trip.

9. The method of claim 1 wherein the search criterion specifies a round trip.

10. A computer-readable medium that is not a data transmission medium embedded with instructions for controlling a computing device to generate a presentation of airline fare information, by a method comprising:

receiving from a user a search request having a search criterion, the search criterion specifying a departure date that is in the future;

retrieving previously observed flight information for airline flights that match the search criterion, the previously observed flight information being observed at various past observation dates including at least four consecutive dates immediately prior to a current date;

retrieving currently observed flight information for airline flights that match the search criterion for a current observation date, the currently observed flight information indicating current fare for airline flights that match the search criterion, generating a fare history graph from the retrieved flight information that illustrates the history of fares for the airline flights that match the search criterion over the past observation dates and the current observation date, wherein the fare history graph includes an observation date axis and a fare axis and indicates a representative fare for the airline flights on the corresponding observation date; and sending for presentation to the user the search results along with the generated fare history graph.

11. The computer-readable medium of claim 10 including collecting on observation dates flight information for airline flights.

12. The computer-readable medium of claim 11 including generating trip information by aggregating the flight information for airline flights associated with a trip.

13. The computer-readable medium of claim 10 wherein the fare history graph illustrates the lowest fare available on an observation date for airline flights that match the search criterion.

14. The computer-readable medium of claim 10 wherein the search criterion identifies a trip, wherein a trip is a combination of departure location and date and return location and date.

15. The computer-readable medium of claim 10 including displaying fares of the current flight information at different time intervals of the departure date.

16. A computing device for generating a presentation of airline fare information, comprising:

an observation store storing, for each of a plurality of observation dates, fares for airline flights as of that observation date, each airline flight having a departure location and date, the past observation dates including at least four consecutive dates immediately prior to a current date;

a memory storing computer-executable instructions of
- a component that receives a user search request having a search criterion, the search criterion comprising a departure location and date and a return location and date;
- a component that retrieves from observation store, for various past observation dates, fares for airline flights that match the search criterion;
- a component that retrieves for a current observation date a current fare for airline flights that match the search criterion;
- a component that generates a fare history graph from the retrieved fares that illustrates the history of fares for the airline flights that match the search criterion over the past observation dates and the current observation date, wherein the fare history graph includes an observation date axis and a fare axis and indicates a representative fare for the airline flights on the corresponding observation date; and
- a component that sends for presentation to the user the search results along with the generated fare history graph; and a processor for executing the computer-executable instructions stored in the memory.

17. The computing device of claim 16 wherein the fare history graph illustrates the lowest fare available on an observation date for airline flights that match the search criterion.

* * * * *